TELECOMMUNICATION SYSTEMS EMBODYING AUTOMATIC EXCHANGES

Filed Nov. 24, 1951 18 Sheets-Sheet 1

INVENTOR
MAURICE MOISE LEVY
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 2

INVENTOR
MAURICE M. LEVY
BY
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 3

INVENTOR
MAURICE M. LEVY
BY
ATTORNEY

INVENTOR
Maurice Moise Levy
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 5

INVENTOR

MAURICE M. LEVY

BY

[signature]

ATTORNEY

INVENTOR
MAURICE M. LEVY
BY
[signature]
ATTORNEY

INVENTOR
MAURICE M. LEVY
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 8

INVENTOR
MAURICE M. LEVY
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 9

INVENTOR
MAURICE M. LEVY
BY
ATTORNEY

INVENTOR
MAURICE M. LEVY
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 11

INVENTOR
MAURICE M. LEVY
BY
[signature]
ATTORNEY

INVENTOR
MAURICE M. LEVY
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 13

INVENTOR
MAURICE M. LEVY
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 14

INVENTOR
MAURICE MOISE LEVY
BY
[signature]
ATTORNEY

TELECOMMUNICATION SYSTEMS EMBODYING AUTOMATIC EXCHANGES

Filed Nov. 24, 1951 18 Sheets-Sheet 15

INVENTOR
Maurice Moise Levy
BY
ATTORNEY

TELECOMMUNICATION SYSTEMS EMBODYING AUTOMATIC EXCHANGES

INVENTOR
Maurice Moise Levy
BY
[signature]
ATTORNEY

INVENTOR
MAURICE MOISE LEVY
BY
[signature]
ATTORNEY

May 22, 1956 M. M. LEVY 2,747,020

TELECOMMUNICATION SYSTEMS EMBODYING AUTOMATIC EXCHANGES

Filed Nov. 24, 1951 18 Sheets-Sheet 18

INVENTOR
MAURICE M. LEVY

BY

ATTORNEY 2,747,020
Patented May 22, 1956

2,747,020

TELECOMMUNICATION SYSTEMS EMBODYING AUTOMATIC EXCHANGES

Maurice Moise Levy, Ottawa, Ontario, Canada, assignor to The General Electric Company Limited, London, England Application November 24, 1951, Serial No. 257,991

4 Claims. (Cl. 179—18)

The present invention relates to telecommunication systems embodying automatic exchanges.

In copending U. S. Patent application No. 247,072 there is described an improved automatic exchange in which a fixed plurality of communication channels is provided. Calling apparatus responsive to an initial calling signal such as a D. C. signal transmitted when a telephone subscriber lifts a telephone handset prior to dialling the number of another subscriber, selects a free one of the aforesaid communication channels. Means are provided whereby, in operation, further calling signals, such as dialling impulses, are then applied in the exchange to transmit to the terminal equipment of the called subscriber an identification signal identifying the selected one of the communication channels. Apparatus is provided to identify the channel indicated by the identification signal and to connect the called subscriber to the identified channel.

In copending U. S. patent application No. 257,786 an automatic exchange is described similar to that in application No. 247,072. The means described in application No. 257,786 for transmitting the signal identifying the seized communication channel differ from those described in application No. 247,072 and comprise a group of low grade channels, one channel for each subscriber on the exchange. It is preferred to use interlaced pulse trains to provide the low grade channels, and the identification signal consists of a coded group of pulses transmitted during each pulse interval in the low grade channel associated with the called subscriber.

The coded group of pulses is applied to call the subscriber being called, and to set into operation suitable apparatus for establishing a connection with the communication channel identified by the coded group of pulses.

In order to ensure an adequate speed of operation, however, it may be found necessary to make the pulses in the coded group of a width so small as to cause difficulties in design. These difficulties arise from the fact that the energy contained in the pulses is small.

An object of the present invention is to provide improved apparatus whereby the aforesaid difficulties can be overcome.

According to the present invention, an automatic exchange comprises a number of low grade calling channels equal to the number of stations connected to the exchange, a number of low grade identification channels equal to the number of calling channels, a number of high grade channels substantially less than the number of calling channels, calling apparatus responsive to an initial calling signal from a first station to seize a free one of the high grade channels, a register device responsive to further calling signals from the first station, and representative of the number of a second station, to transmit a calling signal in a predetermined one of the calling channels and an identification signal in a corresponding one of the identification channels, the identification signal being representative of the number of the seized high grade channel, and apparatus adapted in response to the calling and identification signals to connect the terminal equipment of the second station to the identified high grade channel. A low grade channel is a channel having a relatively small bandwidth whereas a high grade channel is a channel having a relatively large bandwidth. When a free high grade channel is seized it is meant that a free high grade channel is found, a connection established therewith and further stations are prevented from using this channel for establishing another call until this channel is released.

After communication has been established the register device may be released for use in making a further call. The maximum number of calls which can be made simultaneously is, therefore, equal to the number of registers provided. This number will, of course, be determined by calculation of the expected load.

The calling, identification, and high grade channels are all preferably provided by interlaced pulse trains. The calling channels may for example be 2,000 in number and the pulses used for each calling channel may have a recurrence frequency of say one pulse per second. The identification channels may be provided by pulses of the same frequency, and the high grade channels may be 100 in number and each one provided by pulses of a recurrence frequency of 8,000 pulses per second. The identification signal may be provided by a coded group of say two pulses.

It will be appreciated that the calling pulse will be much broader than the pulses in the coded group constituting the identification signal. The identification signal does not, however, have to be used to control either calling apparatus or line finders and hence the design difficulties previously referred to are alleviated.

The invention will now be described, by way of example with reference to the accompanying drawings, in which Figure 1 is a block schematic diagram of one embodiment of the invention;

Figure 1:
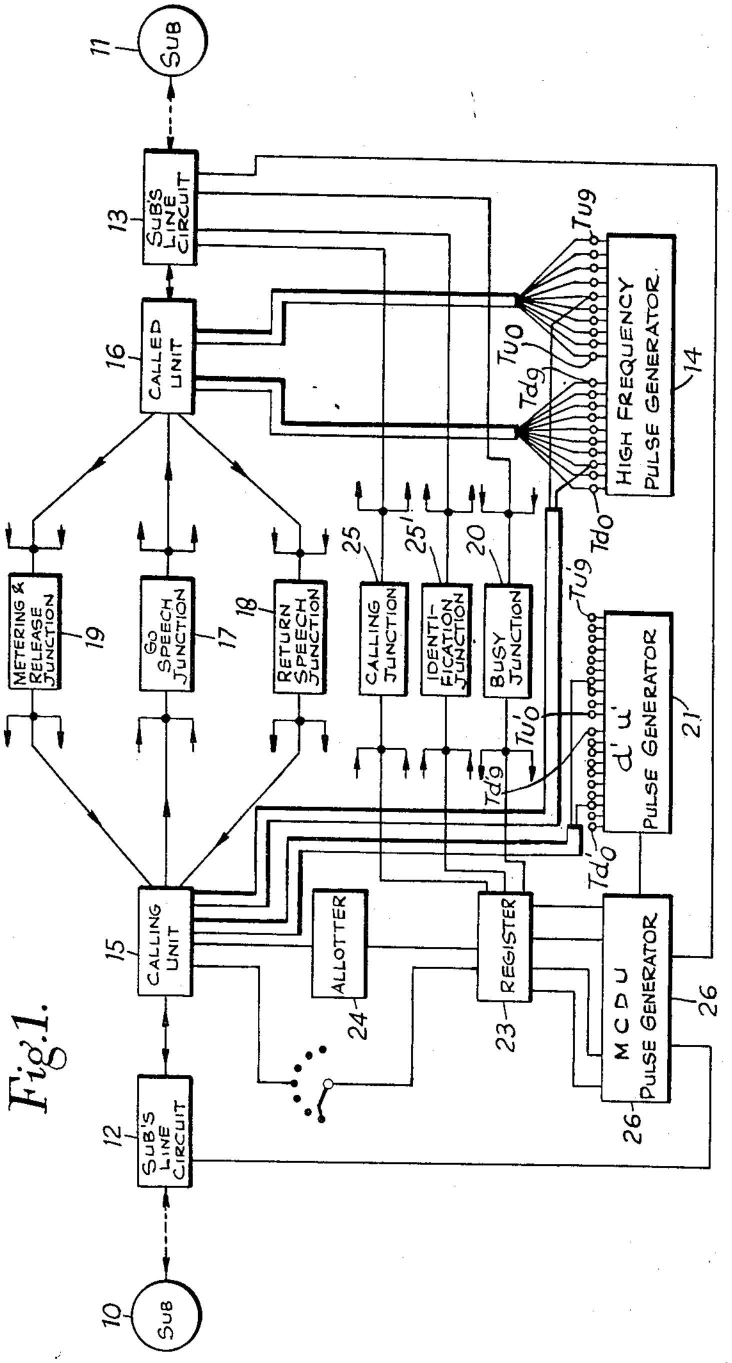
Figure 6:
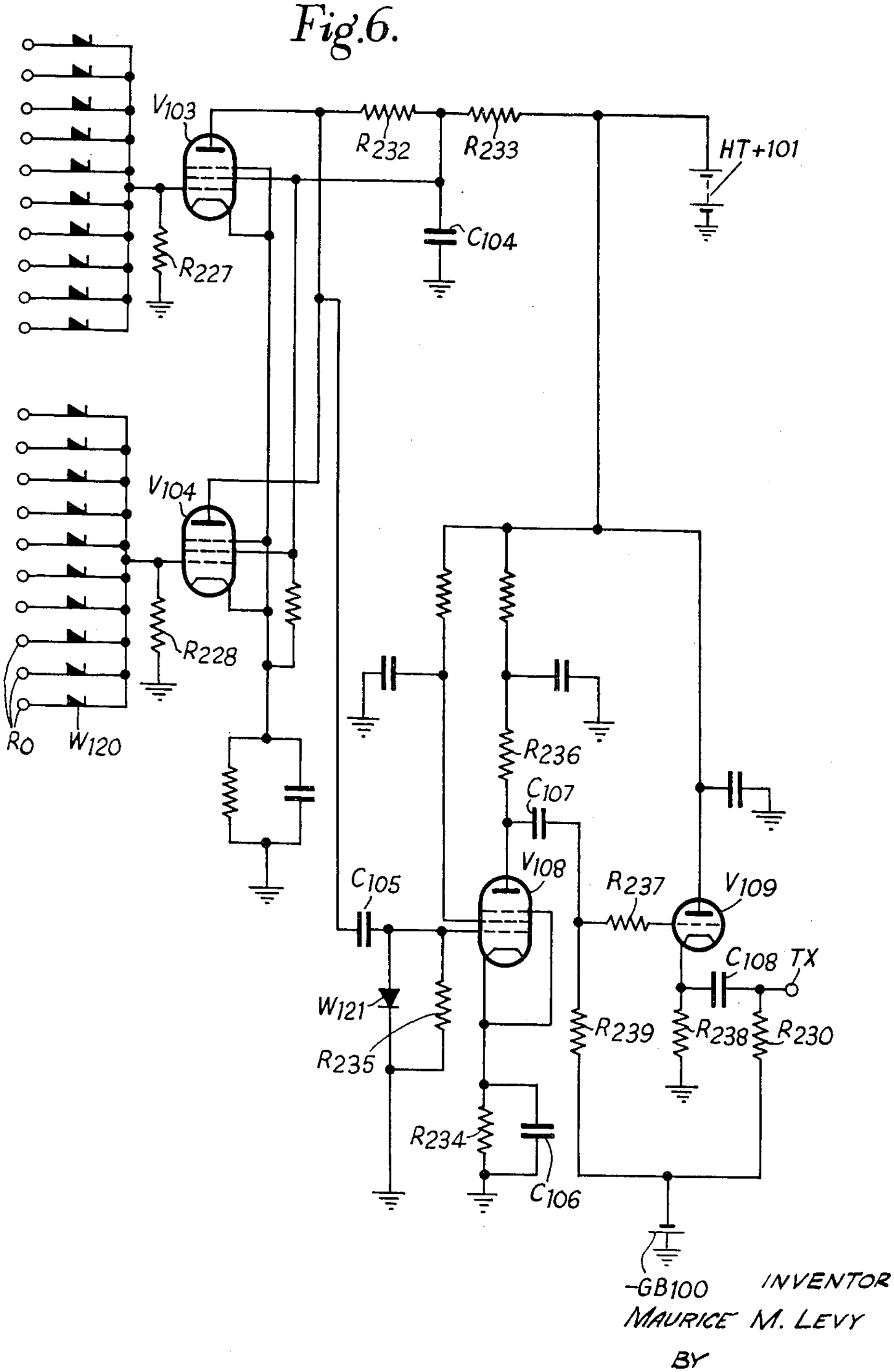
Figure 7:
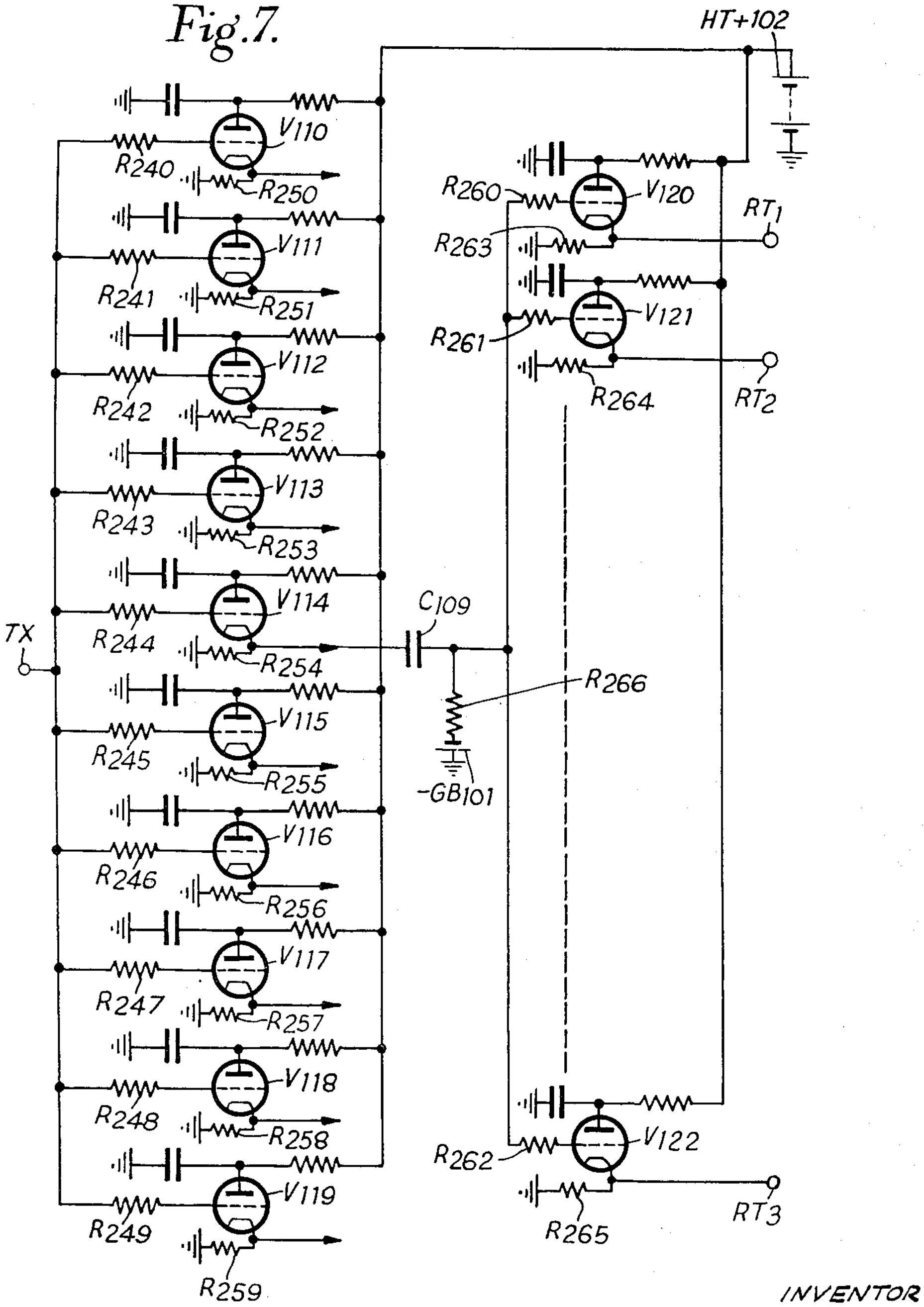
Figure 8:
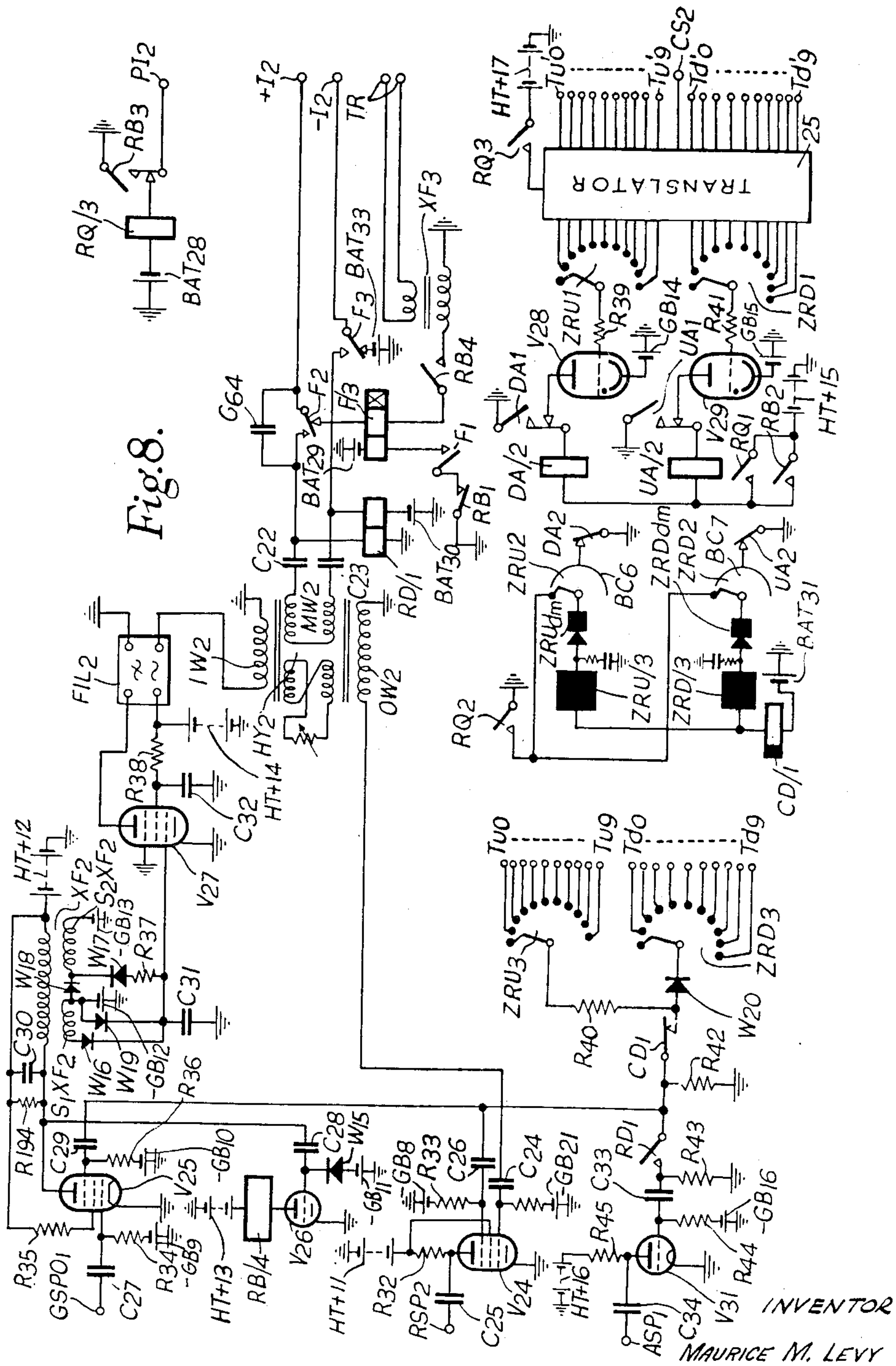
Figure 9:
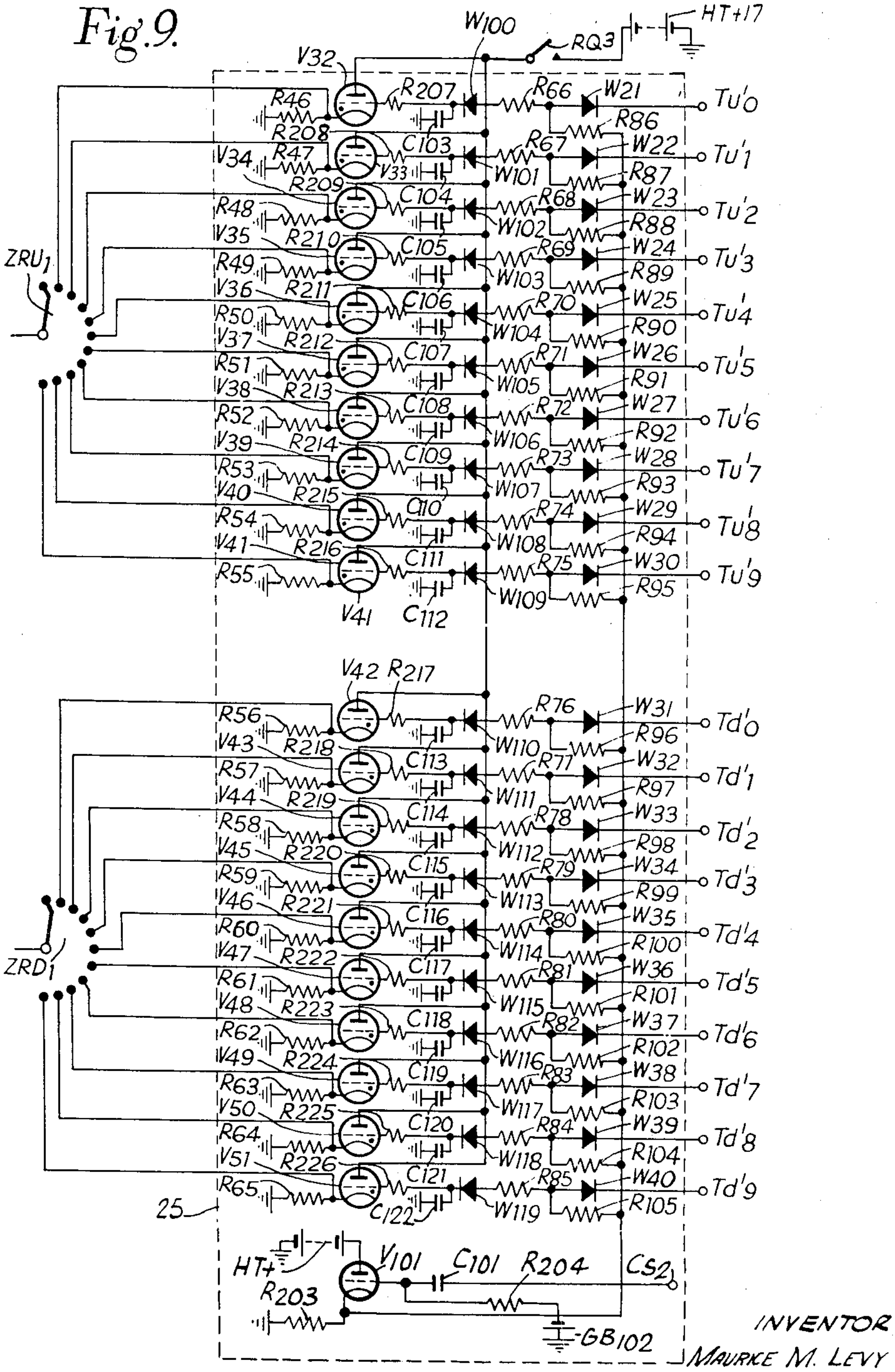
Figure 10:
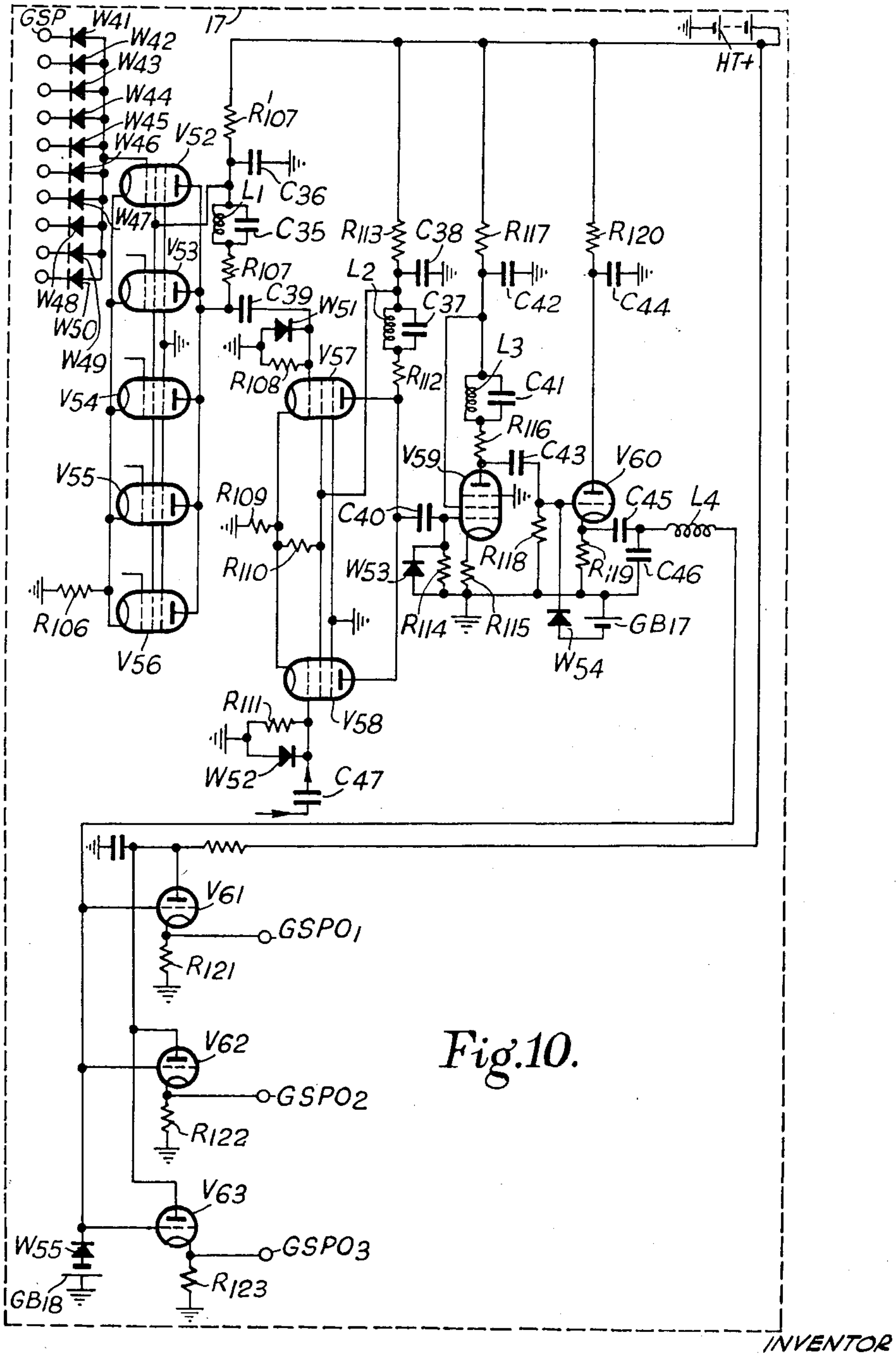
Figure 11:
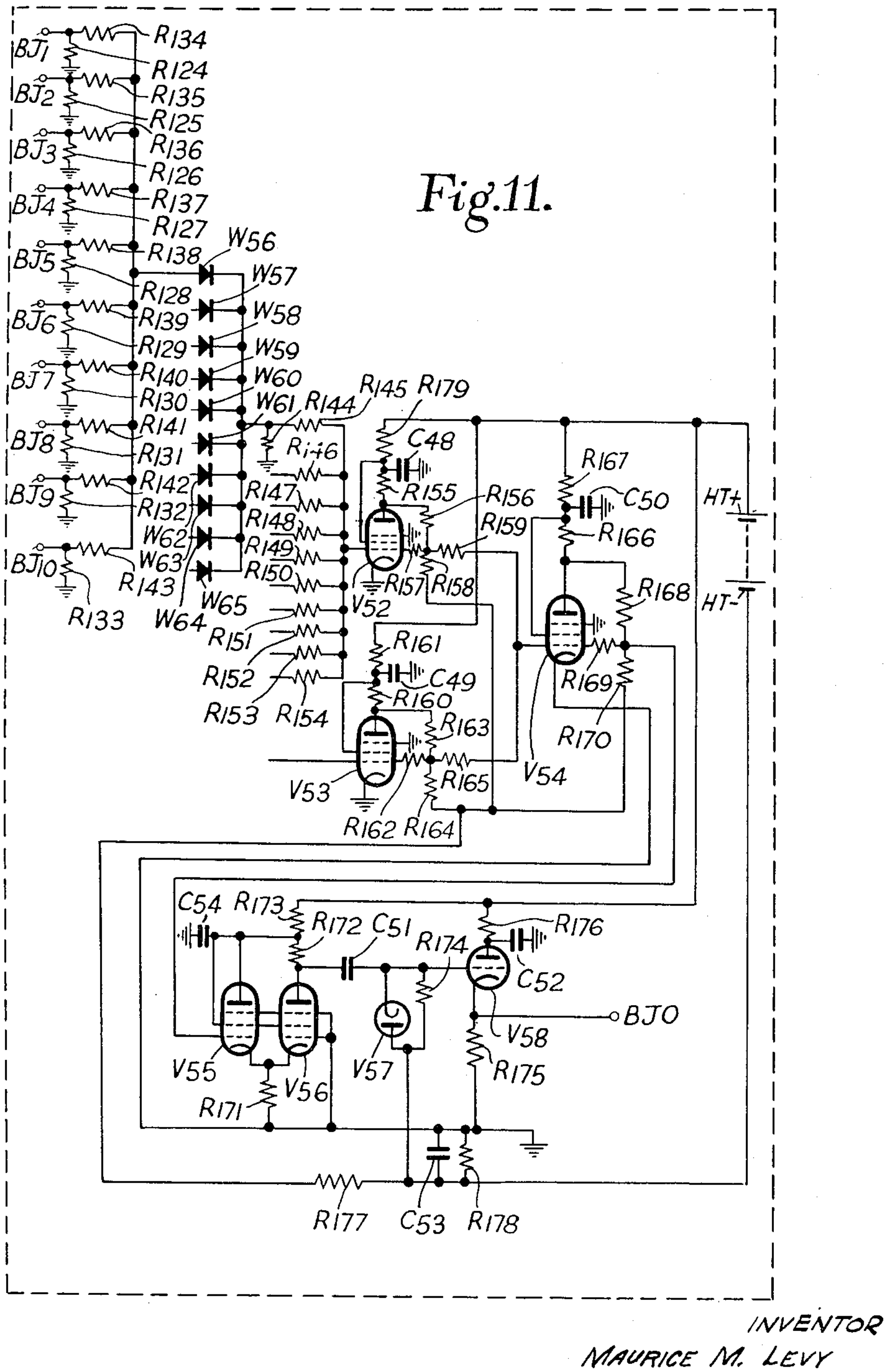
Figure 12A:
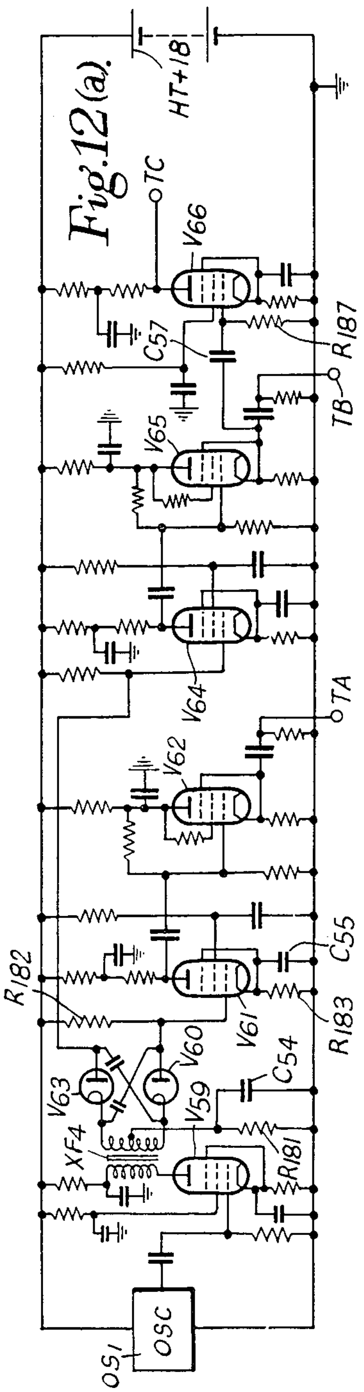
Figure 12B:
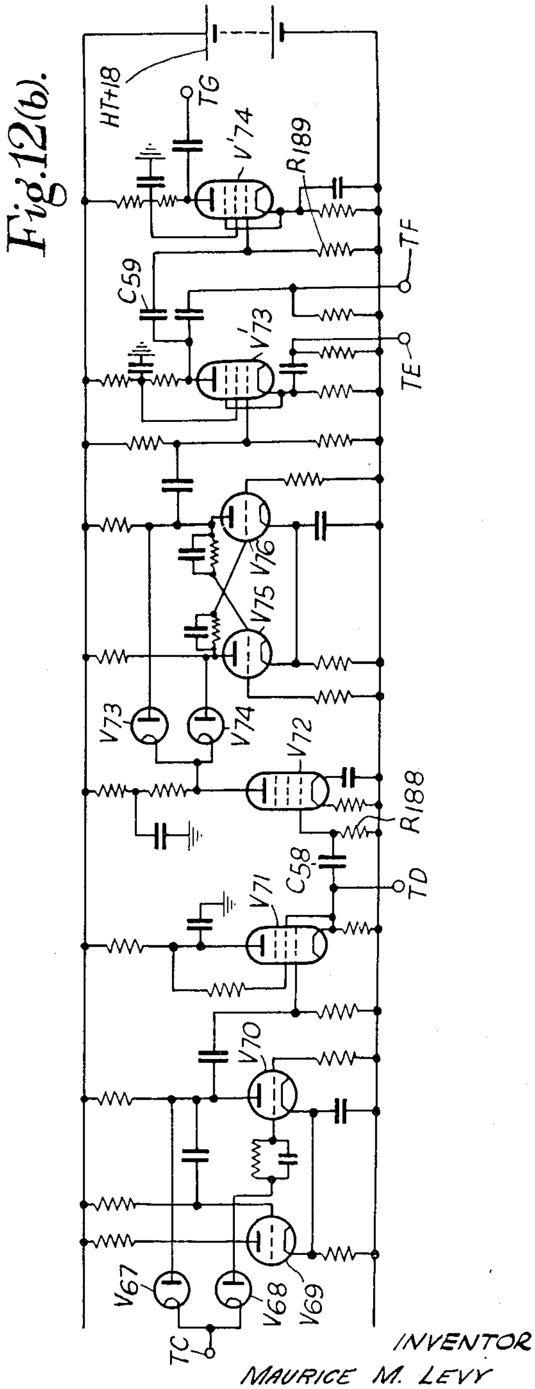
Figures 12C, 12D, 12E:
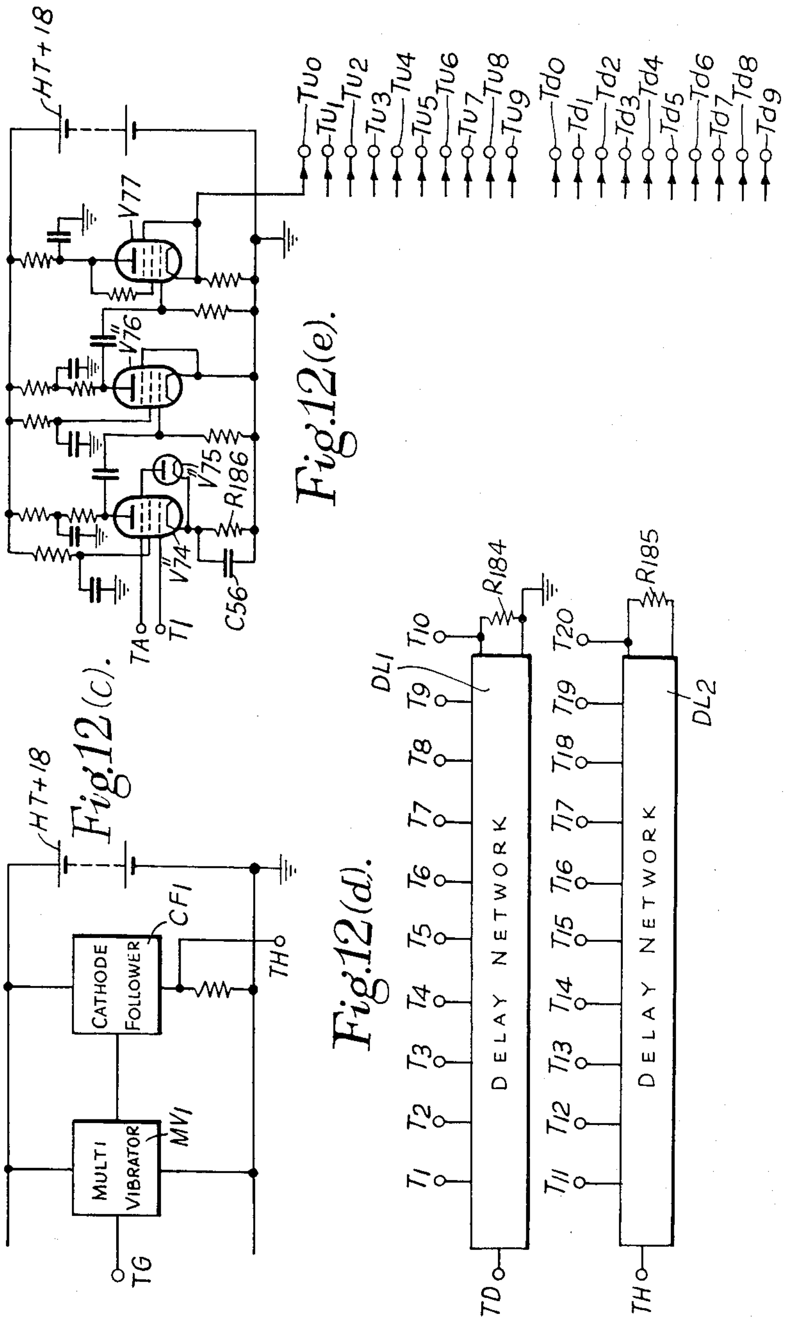
Figure 13:
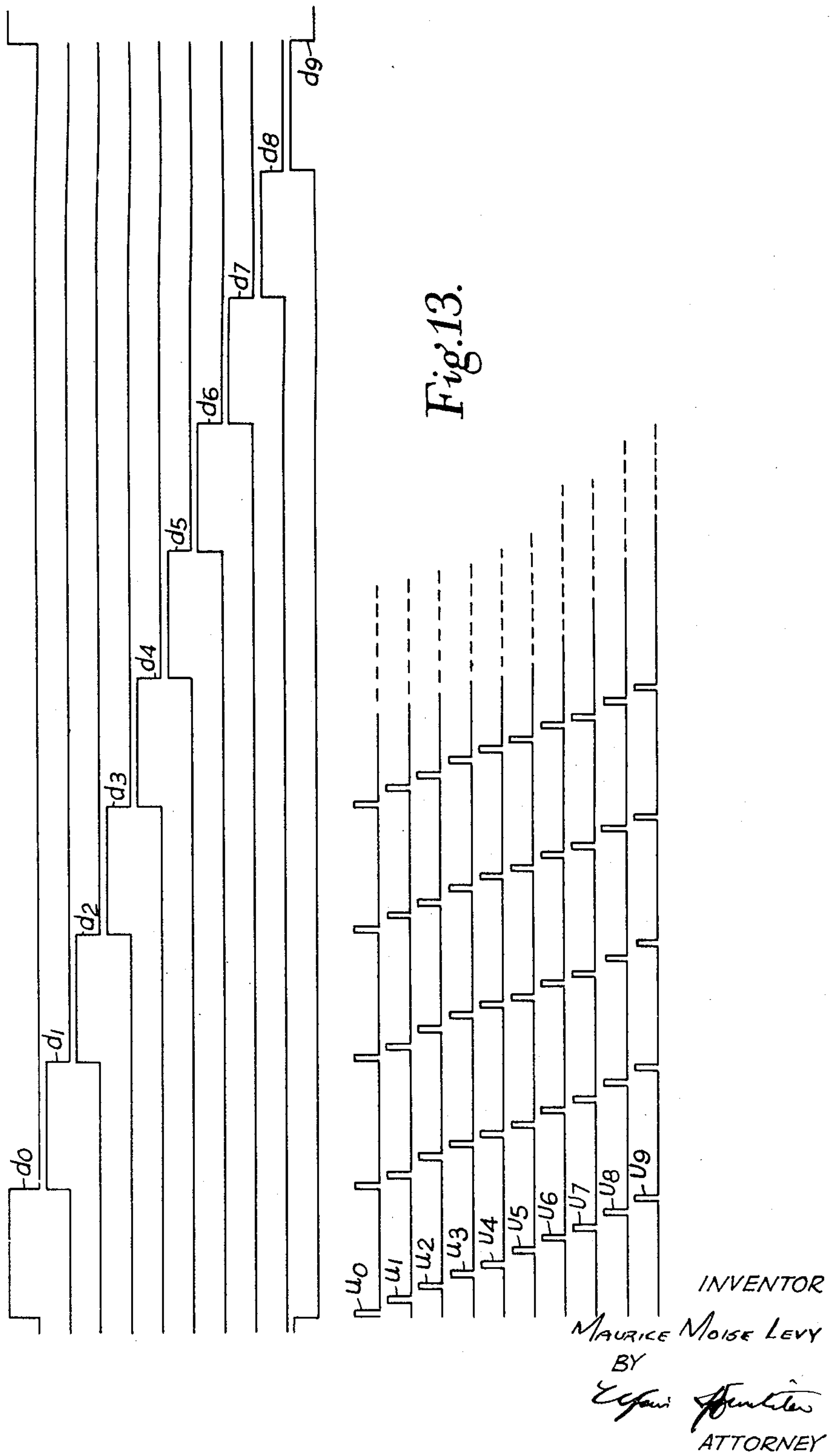
Figure 14:
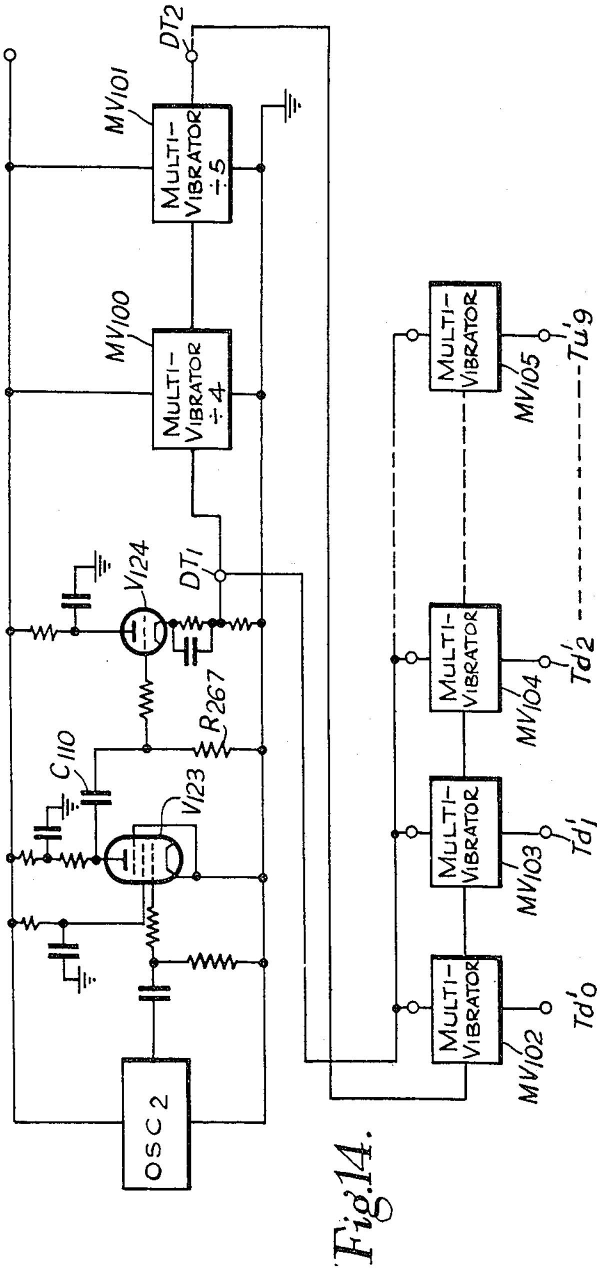
Figure 17:
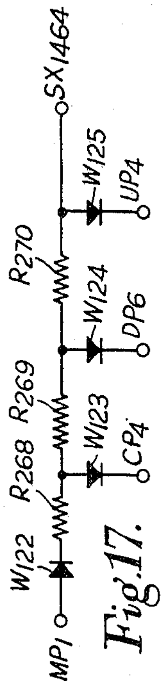
Figure 15:
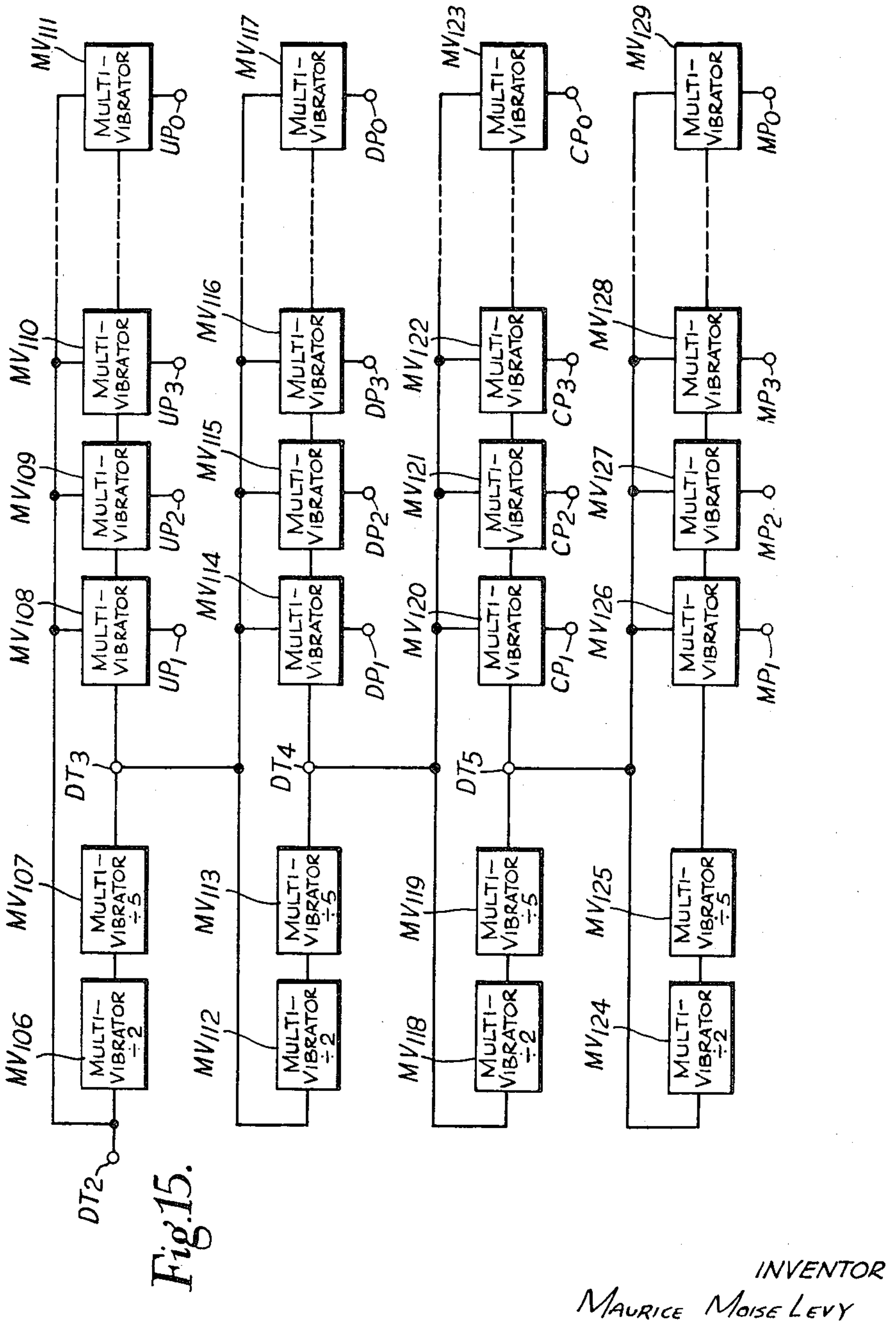
Figure 16:
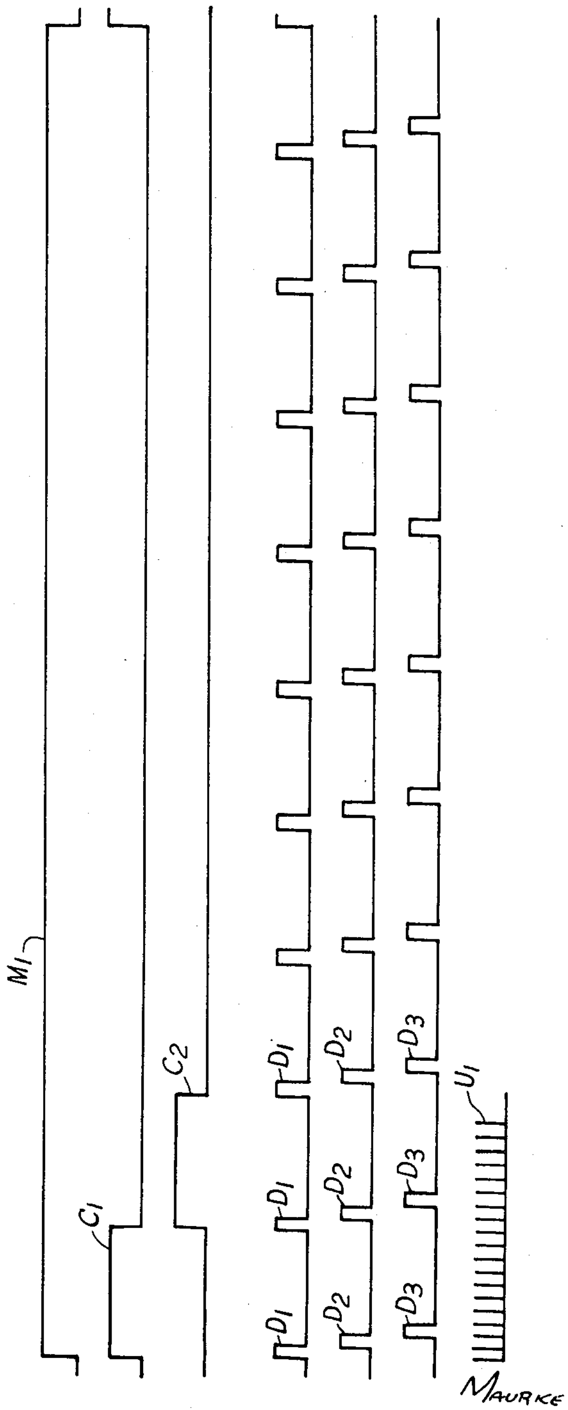

Figs. 6 and 7 together show a circuit diagram of apparatus suitable for use as both a calling junction and an identification junction shown in block form in Fig. 1;

Fig. 8 is a circuit diagram of a called unit shown in block form in Fig. 1;

Fig. 9 is a circuit diagram of a translator shown in block form in Fig. 8;

Fig. 10 is a circuit diagram of apparatus suitable for use as a Go speech junction, a Return speech junction and a metering and release junction shown in block form in Fig. 1;

Fig. 11 is a circuit diagram of a busy junction shown in block form in Fig. 1;

Figs. 12(*a*) to (*e*) together show a circuit diagram of a high frequency pulse generator shown in block form in Fig. 1;

Fig. 13 is an explanatory diagram;

Fig. 14 is a diagram showing in more detail the *d'u'* pulse generator shown in block form in Fig. 1;

Fig. 15 is a diagram showing in more detail the M. C. D. U. pulse generator shown in block form in Fig. 1;

Fig. 16 is a further explanatory diagram;

Fig. 17 is a diagram of a gate circuit; and

Figure 18:
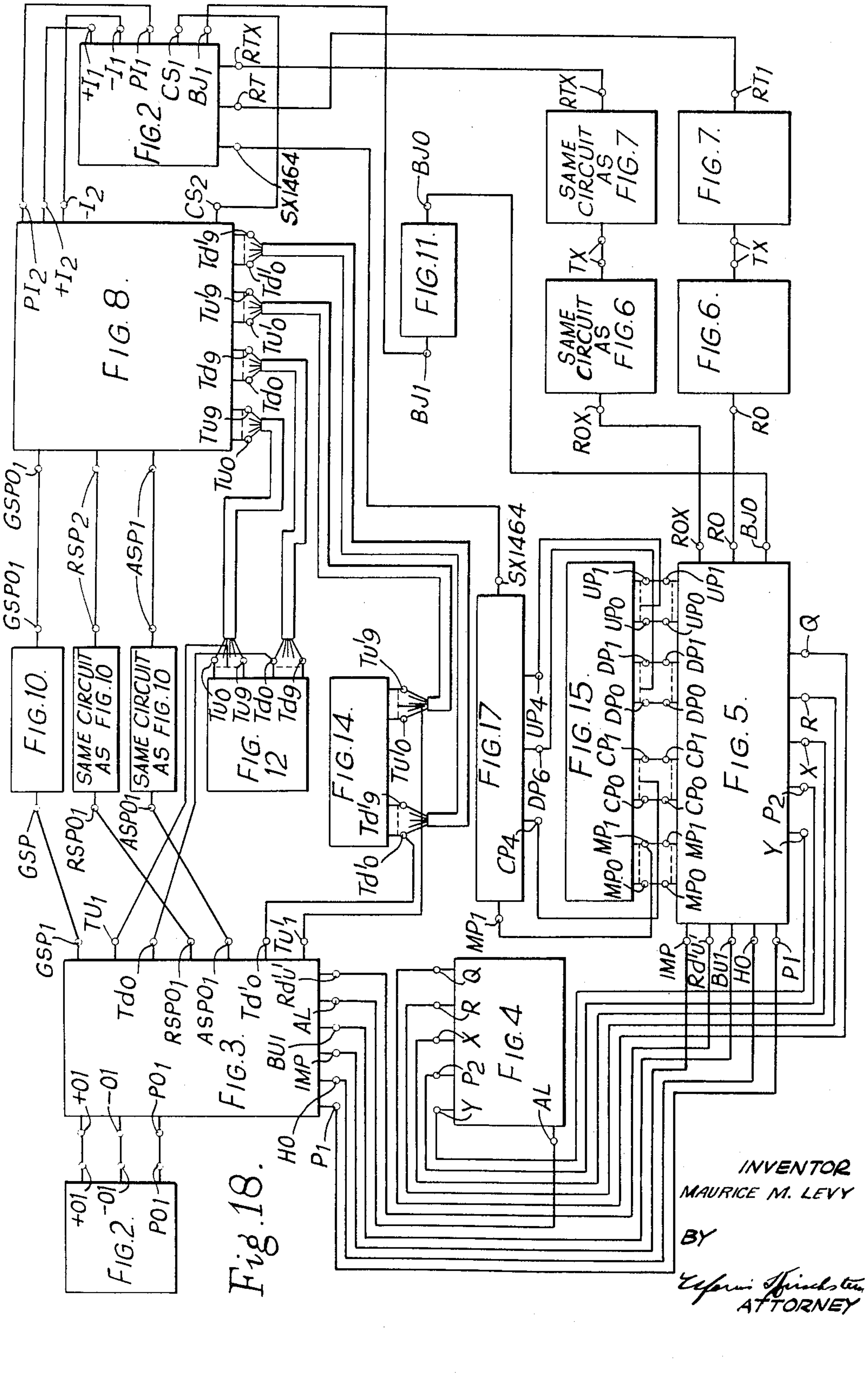

Fig. 18 is a diagram showing the manner in which the drawings of Figs. 2–12, 14, 15 and 17 are interconnected to provide the arrangement shown in block form in Fig. 1.

Referring to Figure 1 this is a block schematic diagram of an automatic exchange suitable for use with 2,000 subscribers. Of the 2,000 subscribers' stations connected to the exchange, one is shown at 10 and another at 11, the station 10 being terminated in the exchange at "sub's line circuit" 12 and the station 11 being terminated at the "sub's line circuit" 13. The "sub's line circuits" will be described later.

The exchange comprises a group of 100 high grade pulse communication channels. This group of channels is provided by means including a pulse generator 14 adapted to generate pulses suitable for combination to provide the 100 channels time-interlaced at a pulse repetition frequency of 8,000 pulses per second in each channel. The 100 channels are terminated by 100 "calling units" respectively of which one is shown at 15. 100 "called units" terminate the other ends of the channels respectively when in use, one of the called units being shown at 16. The calling and called units will be described later. Signals between the calling and called units pass through a "Go speech junction" 17, a "Return speech junction" 18 or a "Metering and release junction" 19 as the case may be. In the event of a called subscriber being engaged, a "busy signal" is transmitted to the calling subscriber by way of a "busy junction" 20 as will be described later.

For use in establishing calls between subscribers a number of allotters 24 and registers 23 are provided together with a calling junction 25, an identification junction 25' and two further pulse generators 21 and 26, examples of which will be described later.

Assuming the subscriber at station 10 to be calling the subscriber at station 11, the first operation occurs in the sub's line circuit 12. This contains a finder which finds a free calling unit 15. An allotter 24 then comes into operation and allots a register 23 to the calling unit 15.

By means of the allotter and a finder in the register the calling unit found by the sub's line circuit 12 is connected to the allotted register 23 as will be described later. A dialling tone is then automatically transmitted to the calling subscriber.

The output of the pulse generator 21 is in the form of a recurring sequence of twenty pulses which for convenience will be divided into two groups of ten each. The first ten pulses in each sequence will be referred to collectively as the $d'$ pulses and the second ten as the $u'$ pulses. The ten $d'$ pulses will be referred to individually as pulses $d'_0$ to $d'_9$ respectively and appear at the terminals $Td'_0$ to $Td'_9$ of the generator 21. The ten $u'$ pulses will be referred to individually as pulses $u'_0$ to $u'_9$ and appear at terminals $Tu'_0$ to $Tu'_9$ of the generator 21.

Each calling unit 15 is connected to one of the terminals $Td'_0$ to $Td'_9$ and to one of the terminals $Tu'_0$ to $Tu'_9$ of the generator 21 different ones of the calling units being connected to different pairs of the terminals $Td'$ and $Tu'$. Thus each calling unit is identified by a different pair of $d'$ and $u'$ pulses and, as will be described later, the pair of $d'$ and $u'$ pulses identifying the calling unit seized by a calling subscriber's line circuit is transmitted to the called subscriber's line circuit to identify the high grade channel on which communication is to be established.

When the calling subscriber hears the dialling tone and dials the number of the called subscriber, the dialling pulses are transmitted through the line circuit 12, and the seized calling unit 15 to the allotted register 23. In the register the four sets of dialling pulses are stored on four uniselectors as will be described later. Four groups of ten pulses each, which will be referred to as the M, C, D and U pulses, are applied to the four uniselectors in the register from the pulse generator 26. Thus the uniselectors in the register select one pulse from each of the four groups of recurring pulses applied thereto and it is arranged that these four selected pulses are combined to form a recurring output pulse which occurs in one recurring channel interval in a recurring sequence of 2,000 channel intervals. The sequence may recur, for example, at the rate of one per second and the 2,000 channels constitute a group of low grade communication channels.

The recurring output pulse to be referred to as the calling pulse from the register is passed to the calling junction and, in addition, is used as a gating pulse and permits the recurring pair of $d'u'$ pulses identified with the seized calling unit to pass to the identification junction 25' only in the low grade channel interval determined by the gating pulse.

The outputs from the calling and identification junctions are applied to all subscriber's line circuits. These circuits have gating pulses applied thereto, however, from the pulse generator 26, the gating pulses applied to each subscriber's line circuit being in the channel whose number corresponds to the subscriber's number on the exchange. Thus the only subscriber's line circuit to respond to a calling pulse appearing at the output of the calling junction is that one whose gating pulse corresponds to the number dialled.

The called subscriber's line circuit then hunts for a free called unit and when a free called unit is found this unit functions, as will be described later, to select appropriate pulses from the output of the generator 14 to enable the called subscriber to establish communication on the channel terminated by the seized calling unit, the selection being determined by the pair of $d'u'$ pulses transmitted through the identification junction.

The automatic exchange shown in Figure 1 will now be described in more detail with reference to Figures 2 to 17. Throughout Figures 2 to 17 all relays and automatic switches are shown in conventional manner the operating windings thereof being referenced with a letter over a figure, the figure indicating the number of relay contacts or banks of switch contacts associated with the winding. The contacts or banks of contacts associated with a winding are given the same letter reference followed by figure, references to different contacts or banks of contacts containing different figures. A contact may also have the same reference letter as its operating winding followed by a further letter or letters. All relays and switches are shown in their unoperated positions.

Figure 2:
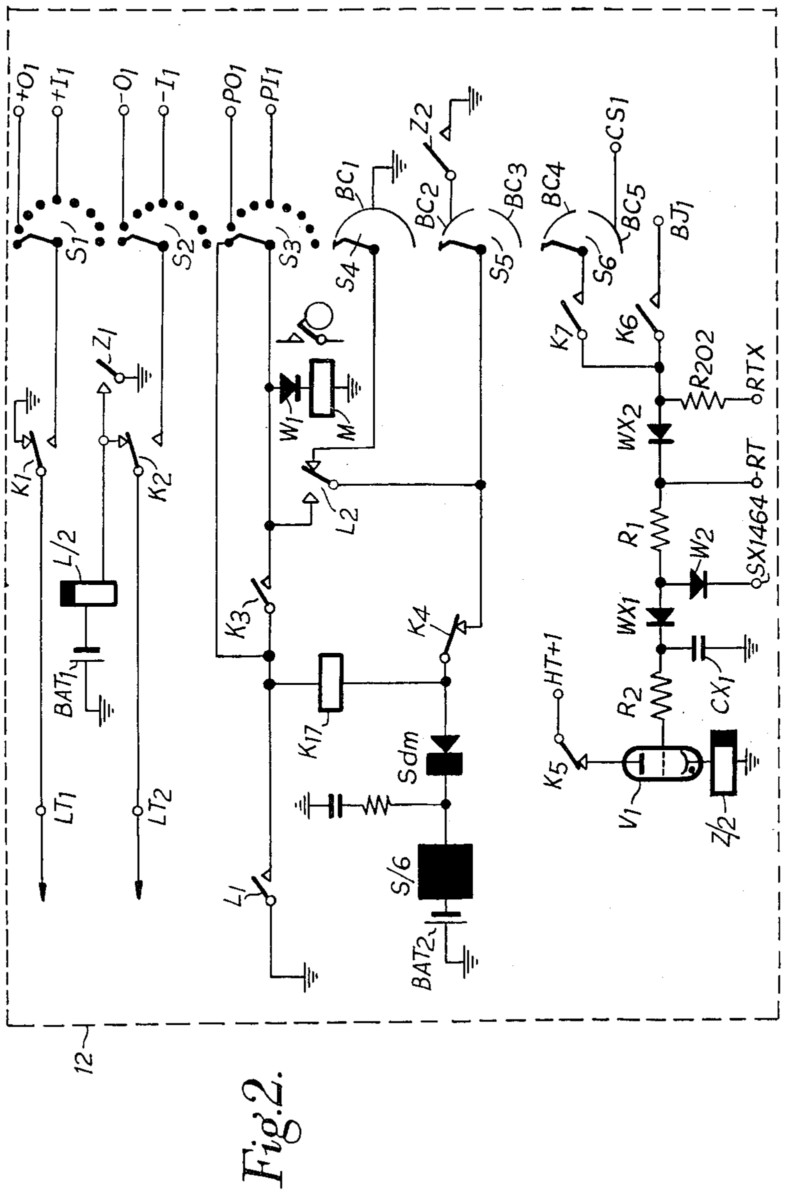
Fig. 2 is a circuit diagram of a subscriber's line circuit shown in block form in Fig. 1.

Referring to Figure 2 this is a circuit diagram of apparatus suitable for use as the sub's line circuits 12 and 13 of Figure 1. The subscriber's line is connected to line terminals $LT_1$ and $LT_2$, $LT_1$ being normally connected to earth through relay contacts K1 and $LT_2$ being normally connected through relay contacts K2, relay winding L and battery $BAT_1$ to earth. A uniselector having six banks of contacts S1 to S6 is operated by a winding S and interruptor S*dm*. The automatic interruptor operation may be as described on page 226 of Telephony, volume 2 by J. Atkinson, published by Sir Isaac Pitman & Sons, Ltd. 1950. This work by Atkinson will be hereinafter referred to as Telephony (either vol. I or II) by Atkinson. Each of the banks S1, S2 and S3 has 25 fixed contacts, a first of the contacts being the "home" contact, the next 12 being "out" contacts, and the other 12 being "in" contacts.

The banks S1 and S2 are for carrying speech, the wipers thereof being connected to $LT_1$ and $LT_2$ respectively, when the apparatus is in use, by relay contacts K1 and K2. Contacts 2 to 13 of S1 are connected to 12 output terminals respectively of which one is shown at $+O_1$, and contacts 14 to 25 are connected to 12 input terminals respectively of which one is shown at $+I_1$. Contacts 2 to 13 of S2 are connected to 12 output terminals of which one is shown at $-O_1$, and contacts 14 to 25 are connected to 12 input terminals of which one is shown at $-I_1$. The bank S3 is used for control purposes, contacts 2 to 13 being connected to 12 output terminals respectively of which one is shown at $PO_1$, and contacts 14 to 25 being connected at 12 input terminals of which one is shown at $PI_1$.

Bank S4 has an insulated home contact and a homing arc $BC_1$. The function of the homing arc is as described on pages 259 and 260 of Telephony, vol. II by Atkinson.

Bank S5 has an insulated home contact, an arcuate contact $BC_2$ extending over the equivalent of contacts 2 to 13 on S1, S2 and S3, and a further arcuate contact $BC_3$ extending over the equivalent of contacts 14 to 25 on S1, S2 and S3. Contact $BC_2$ is connected through relay contacts Z2 to earth.

Bank S6 has an insulated home contact, an arcuate contact $BC_4$ extending over the equivalent of contacts 2 to 13 of S1, S2 and S3, and a further arcuate contact $BC_5$ extending over the equivalent of contacts 14 to 25 on S1, S2 and S3. Contact $BC_5$ is connected to an output terminal $CS_1$.

The home contact on S3 is connected through relay contacts L1 to earth. The wiper of S3 is connected through contacts K3 and L1 to earth through contacts L2, and K4 to contacts S*dm;* and through a rectifier $W_1$ and meter winding M to earth.

The wiper of S4 is connected through contacts L2 to contacts K4 and to the wiper of S5.

The wiper of S6 is connected through relay contacts to the moving contact of contacts K6 which is connected through a rectifier WX2 to a terminal RT, and through a resistor R 202 to a terminal RTX. The fixed contact of relay contacts K6 is connected to an output terminal BJI. The terminal RT is also connected through resistor $R_1$, a rectifier WX1, and a resistor $R_2$ in series to the control grid of a gas-filled triode valve $V_1$ the control grid being connected to earth through a capacitor $CX_1$. An input terminal Sx1464 is connected through a rectifier $W_2$ to the junction of the resistor $R_1$ and rectifier $WX_1$. The cathode lead of the valve $V_1$ has in series therewith a relay winding Z and the anode of the valve $V_1$ is connected through relay contacts K5 to the terminal HT+1 of a source (not shown) of D. C. whose negative terminal is earthed. A relay winding K is connected between contacts S*dm* and L1.

Figure 3:
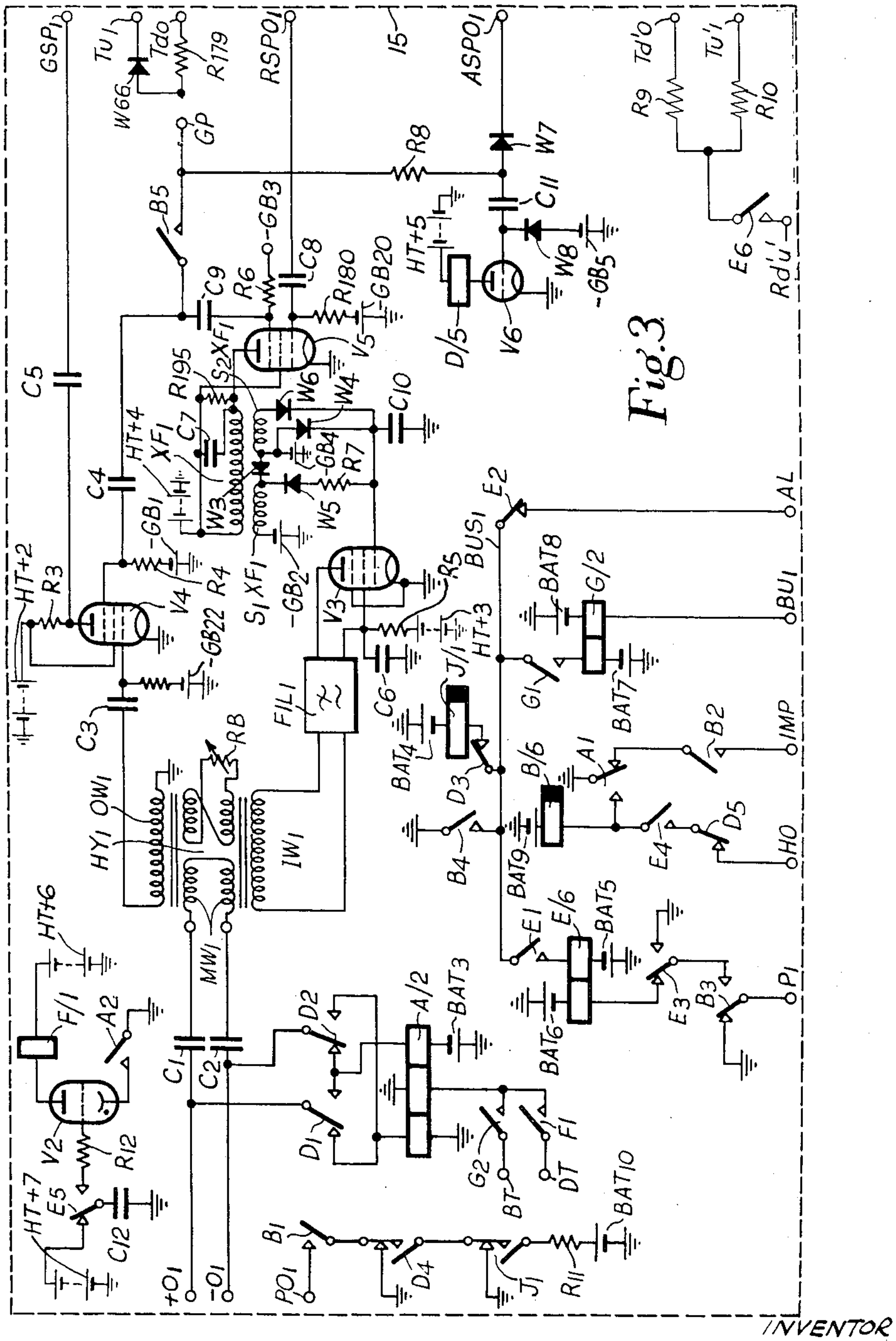
Fig. 3 is a circuit diagram of a calling unit shown in block form in Fig. 1.

Referring now to Figure 3 this is a circuit diagram of apparatus suitable for use as the calling unit 15 of Figure 1. It will be assumed that this calling unit is that connected to terminals $+O_1$, $-O_1$ and $PO_1$ of Figure 2, these terminals also being shown in Figure 3. Terminal $+O_1$ is connected through relay contacts D1 and one winding of relay A to earth. Terminal $-O_1$ is connected through relay contacts D2, a second winding of relay A and a battery $BAT_3$ to earth. Terminals $+O_1$ and $-O_1$ are also connected through capacitors $C_1$ and $C_2$ respectively to a winding $MW_1$ of a hybrid transformer $HY_1$ which has a balancing resistor RB. The function of the hybrid transformer and balancing resistor is as described on page 83, vol. I of Telephony by Atkinson.

The winding $OW_1$ of the hybrid transformer is connected through a capacitor $C_3$ to the control grid of a pentode valve $V_4$ whose anode is connected through a load resistor $R_3$ to the positive terminal of a source HT+2 of D. C. whose negative terminal is earthed. The cathode of the valve $V_4$ is earthed, the screen grid is connected directly to the source HT+2, and the suppressor grid is connected through a resistor $R_4$ to the negative terminal of a bias source $-GB_1$ whose positive terminal is earthed. The suppressor grid is also connected through a capacitor $C_4$ and relay contacts $B_5$ to a terminal GP. The anode of the valve $V_4$ is connected through a capacitor $C_5$ to a terminal $GSP_1$.

Winding $IW_1$ of the hybrid transformer $HY_1$ is connected to the output of a low-pass filter $FIL_1$. One input terminal of the filter is connected to the anode of a pentode valve $V_3$ and the other to earth through a capacitor $C_6$ and through a resistor $R_5$ to the positive terminal of a source HT+3 of D. C. The suppressor grid and cathode of the valve $V_3$ are connected to earth.

A terminal $RSPO_1$ is connected through a capacitor $C_8$ to the control grid of a pentode valve $V_5$ whose cathode is earthed. Negative bias is applied to the control grid of the valve $V_5$ from the negative terminal of a bias source $-GB_{20}$ whose positive terminal is earthed. The anode of the valve $V_5$ is connected through the primary winding of a transformer $XF_1$ to the positive terminal of a source HT+4 of D. C. whose negative terminal is earthed. The screen grid of the valve $V_5$ is connected directly to the source HT+4 and the suppressor grid is connected through a resistor $R_6$ to the negative terminal of a bias source $-GB_3$ whose positive terminal is earthed. The suppressor grid of the valve $V_5$ is also connected through a capacitor $C_9$ and the contacts $B_5$ to the terminal GP.

The transformer $XF_1$ has two secondary windings $S_1XF_1$ and $S_2XF_1$. One terminal of winding $S_1XF_1$, is connected to the negative terminal of a bias source $-GB_2$ and the other terminal is connected through a rectifier $W_5$, and a resistor $R_7$ to the control grid of the pentode valve $V_3$ and is connected through a rectifier $W_3$ to the negative terminal of a bias source $-GB_4$ whose positive terminal is earthed. One terminal of the winding $S_2XF_1$ is connected to the negative terminal of the source $-GB_4$ and the other terminal of the winding $S_2XF_1$ is connected through a rectifier $W_6$ to the control grid of the valve $V_3$. The negative terminal of the source $-GB_4$ is also connected to the control grid of $V_3$ through a rectifier $W_4$ and a capacitor $C_{10}$ is connected between the control grid of $V_3$ and earth.

A terminal $ASPO_1$ is connected through a rectifier $W_7$ and capacitor $C_{11}$ to the control grid of a triode valve $V_6$ whose cathode is earthed and whose anode is connected through a relay winding D to the positive terminal of a D. C. source HT+5 whose negative terminal is earthed. The control grid of the valve $V_6$ is also connected through a rectifier $W_8$ to the negative terminal of a bias source $-GB_5$ whose positive terminal is earthed. The junction of the capacitor $C_{11}$ and the rectifier $W_7$ is connected to the terminal GP through a resistor $R_8$.

A relay winding J has one terminal connected to earth through a battery $BAT_4$. The other terminal of the relay winding J is connected to earth through relay contacts D3, a busbar $BUS_1$ and relay contacts B4. The busbar is connected through relay contacts E1, one winding of relay E and a battery $BAT_5$ to earth. A control terminal $P_1$ is connected either directly to earth or through the other winding of relay E and a battery $BAT_6$ to earth depending upon the setting of relay contacts B3 and E3. The busbar $BUS_1$ is connected through relay contacts G1, one winding of a relay G and a battery $BAT_7$ to earth. The other winding of the relay G has one terminal connected to earth through a battery $BAT_8$, and has its other terminal connected directly to a terminal $BU_1$. The busbar is also connected through relay contacts E2 to an output terminal AL.

Terminal HO is connected through relay contacts D5, E4 and A1 to earth. A relay winding B has one terminal connected through contacts A1 to earth and the other through a battery $BAT_9$ to earth. An output terminal IMP is connected through relay contacts B2 and A1 to earth.

Input terminals T$d'_0$ and T$u'_1$ are connected together through resistors $R_9$ and $R_{10}$ and the junction of these two resistors is connected through relay contacts E6 to an output terminal R$d'u'$.

Terminal $PO_1$ is connected through relay contacts B1 to relay contacts D4 which depending upon their setting, provide either an earth connection or a connection to relay contacts J1. The relay contacts J1 provide either an earth connection or a connection through a resistor $R_{11}$ and a battery $BAT_{10}$ to earth.

The cathode of a gas-filled triode valve $V_2$ is connected to earth through relay contacts A2 and its anode is connected through a relay winding F to the positive terminal of a suitable source HT+6 of D. C. whose negative terminal is earthed. A capacitor $C_{12}$ is normally connected to the positive terminal of a source HT+7 of D. C. whose negative terminal is earthed. The control grid of the valve $V_2$ is connected to the capacitor $C_{12}$ through a resistor $R_{12}$ and the contacts E5.

A source (not shown) of busy tone is connected to the terminal BT which is connected to the centre winding of the relay A through relay contacts $G_2$.

A source (not shown) of dialling tone is connected to the terminal DT which is connected through relay contacts F1 to the centre winding of the relay A.

Figure 4:
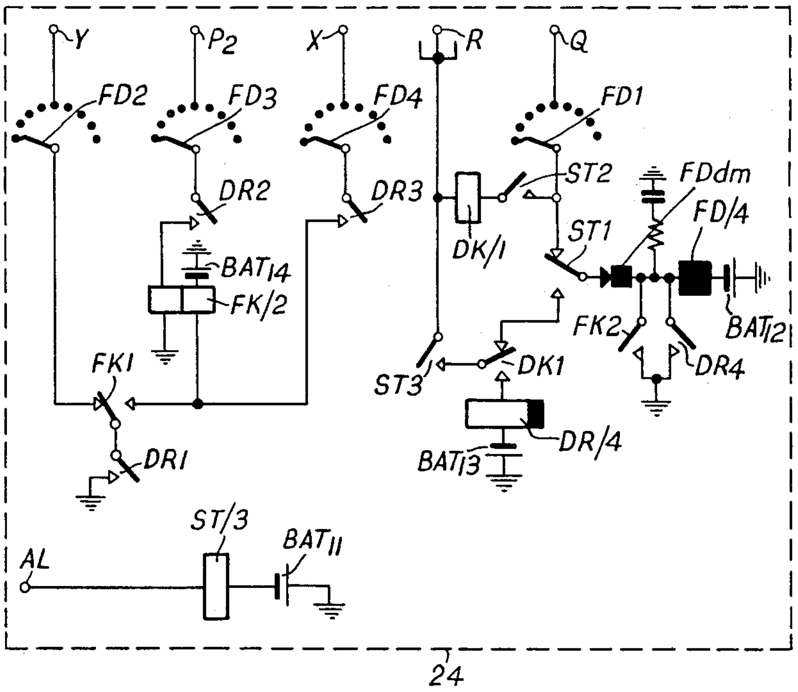
Fig. 4 is a circuit diagram of an allotter shown in block form in Fig. 1.

Referring now to Fig. 4 this is a circuit diagram of an allotter suitable for use at 24 in Fig. 1. The terminal AL corresponds to the terminal AL of Fig. 3, and is connected through a relay winding ST and a battery $BAT_{11}$ to earth. A uni-selector FD has four banks of contacts FD1, FD2, FD3, and FD4 whose wipers are controlled by automatic stopping apparatus including winding FD and contacts FD*dm*. The wiper of the bank FD1 is connected through relay contacts ST1, the contacts FD*dm*, the winding FD and a battery $BAT_{12}$ to earth. The junction of the contacts FD*dm* and the winding FD is connected to earth through relay contacts FK2 and DR4. The fixed contacts of the bank FD1 are connected to output terminals respectively of which one is shown at Q. A terminal R is connected through a relay winding DK and relay contacts ST2 to the moving contact of the bank FD1. The terminal R is also connected through contacts ST3, and DK1 to contacts ST1. The contacts DK1 are also connected through relay winding DR and a battery $BAT_{13}$ to earth.

The bank contacts of the bank FD4 are connected to output terminals respectively of which one is shown at X. The wiper of the bank FD4 is connected through relay contacts DR3, FK1, and DR1 to earth.

The fixed contacts of the bank FD3 are connected to output terminals respectively of which one is shown at $P_2$. The wiper of the bank FD3 is connected through relay contacts DR2 and one winding of relay FK to earth. One terminal of the other winding of the relay FK is connected through the contacts FK1 and DR1 to earth, and the other terminal thereof is connected through a battery $BAT_{14}$ to earth.

The bank contacts of the bank FD2 are connected to output terminals respectively of which one is shown at Y. The wiper of FD2 is connected through the contacts FK1 and DR1 to earth.

Figure 5:
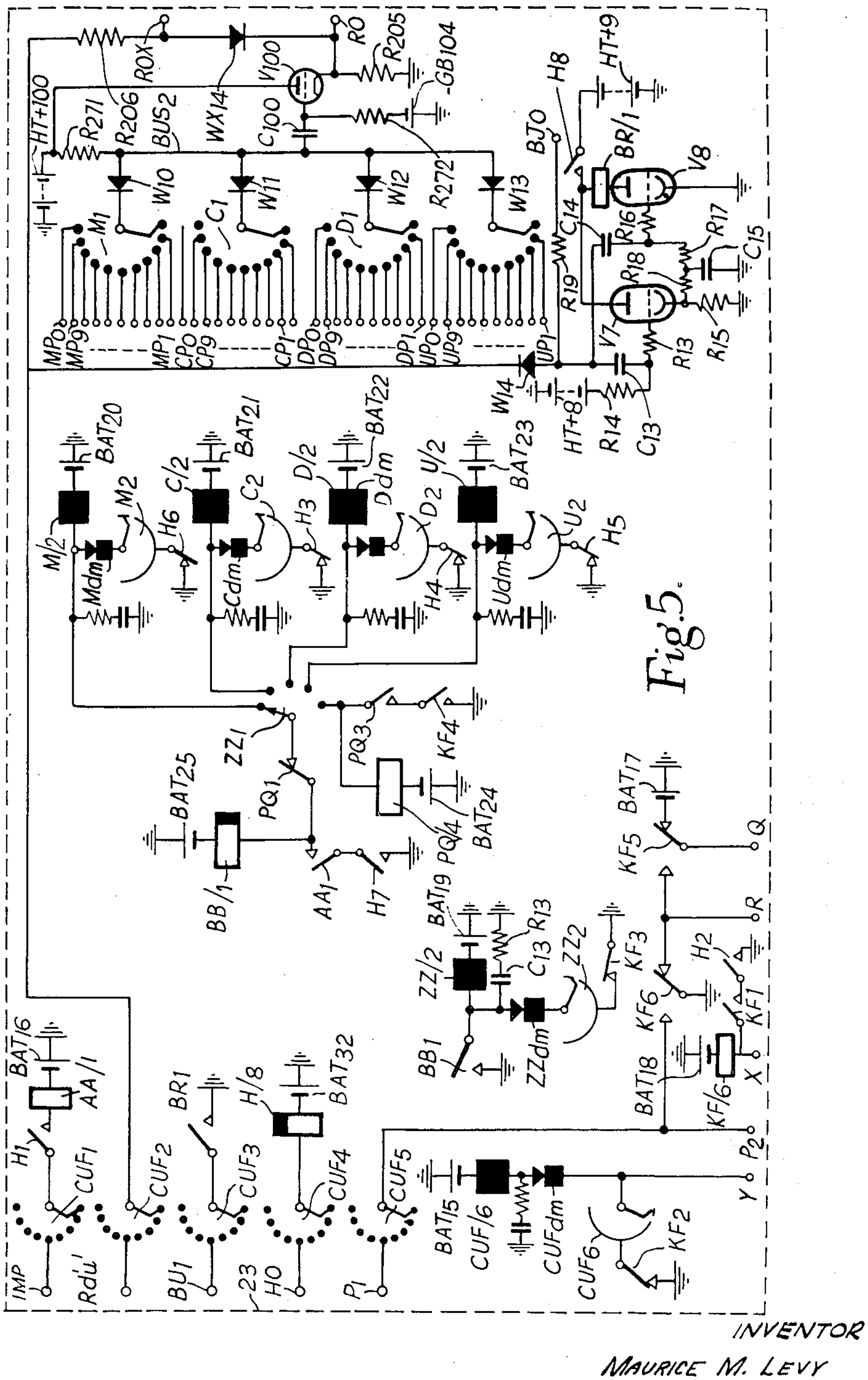
Fig. 5 is a circuit diagram of a register shown in block form in Fig. 1.

Referring now to Fig. 5, this is a theoretical circuit diagram of a suitable register and calling unit finder for use in the arrangement of Fig. 1. The terminals IMP, R*d'u'*, $BU_1$, HO, and $P_1$ correspond to the terminals of the same reference in Fig. 3, and terminals Y, $P_2$, X, R and Q correspond to those of the same reference in Fig. 4.

The calling unit finder section of the arrangement shown in Fig. 5 comprises a uni-selector CUF having six banks CUF1 to CUF6, whose wipers are driven by an automatic stepping circuit including a battery $BAT_{15}$ connected between earth and one terminal of winding CUF, and contacts CUF*dm* connected between the other terminal of the winding CUF and the terminal Y. The IMP terminals of several callings units (15, Fig. 1) are connected to the bank contacts respectively of the bank CUF1 whose wiper is connected through relay contacts H1, a relay winding AA and a battery $BAT_{16}$ to earth. The terminals R*d'u'* of the several calling units are connected to the bank contacts of CUF2 respectively whose wiper is connected through a resistor $R_{206}$ and a rectifier WX14 to an output terminal RO. The $BU_1$ terminals of the several calling units are connected to the bank contacts respectively of CUF3 whose wiper is connected through relay contacts BR1 to earth. The HO terminals of the several calling units are connected to the bank contacts respectively of CUF4 whose wiper is connected through a relay winding H and a battery $BAT_{32}$ to earth. The $P_1$ terminals of the several calling units are connected to the bank contacts respectively of CUF5 whose wiper is connected to terminal $P_2$. The bank CUF6 is a homing bank. Each of the banks CUF1 to CUF6 has an insulated home contact.

The terminal $P_2$ is also connected through relay contacts KF6 to earth. The terminal R is connected through relay contacts KF6 to earth and through relay contacts KF5 to terminal Q which is also connected through contacts K5 and a battery $BAT_{17}$ to earth. The terminal X is connected through a relay winding KF and battery $BAT_{18}$ to earth, and through relay contacts KF1 and H2 to earth.

A uni-selector ZZ has two banks ZZ1 and ZZ2 whose wipers are driven by an automatic stepping circuit including winding ZZ and contacts ZZ*dm*. The winding ZZ has one terminal connected through a battery $BAT_{19}$ to earth and the other through relay contacts BB1 to earth, and through the contacts ZZ*dm* to the wiper of ZZ2. A capacitor $C_{13}$ and resistor $R_{13}$ are employed to reduce sparking between the contacts ZZ*dm* when in operation. The bank ZZ2 is a homing bank and is connected to earth through a relay contact KF3.

The register section of Fig. 5 comprises four uni-selectors M, C, D and U. The uni-selectors are operated by impulses caused by the operation of relay contacts AA1 as will be described later. The moving contact of AA1 is connected through relay contacts H7 to earth and the fixed contact of AA1 is connected through relay contacts $PQ_1$ to the wiper of the uni-selector bank ZZ1. The first four bank contacts of ZZ1 are connected to the windings M, C, D and U respectively whose other terminals are connected to earth through batteries $BAT_{20}$ to $BAT_{23}$ respectively. The first four bank contacts of ZZ1 are also connected through contacts M*dm*, C*dm*, D*dm* and U*dm* to the wipers of the banks M2, C2, D2 and U2 respectively. Each of these banks is a homing bank. The homing arcs of the homing banks M2, C2, D2 and U2 are connected to earth through relay contacts H6, H3, H4 and H5 respectively.

The fifth contact of ZZ1 is connected through a relay winding PQ and a battery $BAT_{24}$ to earth, and through relay contacts $PQ_3$ and $KF^4$ in series to earth. A relay winding BB is connected between the fixed contact of AA1 and the negative terminal of a battery $BAT_{25}$ whose positive terminal is earthed.

Each of the banks M1, C1, D1 and U1, has an insulated home contact and ten bank contacts. The ten bank contacts of M1 are connected to terminals $MP_1$ to $MP_9$ and $MP_0$ respectively. The ten bank contacts of C1 are connected to terminals $CP_1$ to $CP_9$ and $CP_0$ respectively. The ten bank contacts of D1 are connected to terminals $DP_1$ to $DP_9$ and $DP_0$ respectively, and those of U1 are connected to terminals $UP_1$ to $UP_9$ and $UO_0$ respectively. The wipers of the banks $M_1$, $C_1$, $D_1$, and $U_1$ are connected through rectifiers $W_{10}$, $W_{11}$, $W_{12}$, and $W_{13}$ respectively to a busbar BUS2 which is connected through a resistor $R_{271}$ to the positive terminal of a source of D. C. HT+100 whose negative terminal is earthed. The bus-bar BUS2 is also connected through a capacitor $C_{100}$ to the control grid of a triode valve $V_{100}$ whose anode is connected to the positive terminal of the source HT+100 and whose cathode is connected to earth through a cathode load resistor $R_{205}$. The control grid of the triode $V_{100}$ is also connected through a resistor $R_{272}$ to the negative terminal of a bias battery $-GB_{104}$ whose positive terminal is earthed. The cathode of the triode $V_{100}$ is connected directly to an output terminal RO and through a rectifier $WX_{14}$ to a second output terminal ROX. The terminal ROX is connected through a resistor $R_{206}$ to the wiper of the uni-selector bank $CUF_2$ and thnce to the terminal $R_{d'u'}$.

An input terminal BJO is connected through a resistor $R_{19}$ and a capacitor $C_{13}$ and resistor $R_{13}$ in series to the control grid of a gas-filled triode $V_7$. The junction of $R_{13}$ and $C_{13}$ is connected through a resistor $R_{14}$ to the positive terminal of a source HT+8 of D. C. whose negative terminal is earthed. The cathode of the valve $V_7$ is connected to earth through a resistor $R_{15}$ and the anode of the valve $V_7$ is connected through relay contacts H8 to the positive terminal of a source HT+9 of D. C. whose negative terminal is earthed.

The terminal BJO is also connected through a capacitor $C_{14}$ and a resistor $R_{16}$ to the control grid of a gas-filled triode $V_8$ whose cathode is earthed. The junction of $C_{14}$ and $R_{16}$ is connected through two resistors $R_{17}$ and $R_{18}$ in series to the cathode of the valve $V_7$, and the junction of $R_{17}$ and $R_{18}$ is connected to earth through a capacitor $C_{15}$. The anode of the valve $V_8$ is connected to the positive terminal of the source HT+9 through contacts $H_8$ and a relay winding BR. The junction of the resistor $R_{19}$ and the capacitor $C_{13}$ is connected through a rectifier $W_{14}$ to the wiper of switch bank CUF2.

Referring now to Figures 6 and 7, part of the calling junction 25 of Figure 1 is shown in Figure 6, and Figure 7 shows a further part. Assuming 20 registers to be used the pulses appearing at the output terminals RO of the 20 registers are combined in two groups of ten by means of rectifiers W120 as shown in Figure 6. The combined pulses in the first group appear across a resistor R227 and those in the second group across a resistor R228.

The two groups of pulses appearing across the resistors R227 to R228 are applied to the control gride of two pentode valves $V_{103}$ and $V_{104}$ respectively which have a common anode load resistor R232. A resistor R233 and a capacitor $C_{104}$ are for decoupling purposes. The combined outputs from the valves $V_{103}$ and $V_{104}$ appearing across the common load resistor R232 are applied through a capacitor C105 to the control grid of a valve $V_{108}$ whose cathode is connected to earth through a self-biasing circuit comprising a resistor R234 and a capacitor $C_{106}$. A rectifier $W_{121}$ and a resistor R235 are connected in parallel between the control grid of the valve $V_{108}$ and earth and function to render the pulses appearing at the control grid of the valve $V_{108}$ of positive polarity.

The output of the valve $V_{108}$ appearing across a load resistor $R_{236}$ is applied through a capacitor $C_{107}$ and a resistor $R_{237}$ to the control grid of a valve $V_{109}$ which has a cathode load resistor $R_{238}$. Negative bias is applied through a resistor $R_{239}$ to the control grid of the valve $V_{109}$ from the negative terminal of a bias source —GB100 whose positive terminal is earthed. The cathode of the valve $V_{109}$ is connected through a capacitor $C_{108}$ to a terminal TX which is also connected through a resistor R230 to the negative terminal of the source —GB100.

In Figure 7 the terminal TX is that also shown in Figure 6 and is connected through resistors P240 to R249 to the control grids of ten triode valves $V_{110}$ to $V_{119}$ whose cathodes are connected to earth through load resistors $R_{250}$ to $R_{259}$ respectively. The outputs appearing across the cathode load resistors of the ten valves $V_{110}$ to $V_{119}$ are applied to ten groups respectively of triode valves connected as cathode followers. Each of these groups has ten cathode followers and three of the cathode followers in the group connected to the output of the valve $V_{114}$ are shown in Figure 7.

The output voltages appearing at the cathode of the valve $V_{114}$ are applied through a capacitor $C_{109}$ and resistors R260 to R262 to the control grids of three triode valves $V_{120}$, $V_{121}$ and $V_{122}$ in the group shown. The cathodes of the three valves $V_{120}$ to $V_{122}$ are connected to earth through resistors R263 to R265 and to three output terminals $RT_1$, $RT_2$ and $RT_3$ respectively. Negative grid bias is applied through a resistor R266 to the control grids of the triodes $V_{120}$ to $V_{122}$ from the negative terminals of a bias source —GB101 whose positive terminal is earthed. The anode circuits of all the valves in Figure 7 are decoupled as shown.

The identification junction 25' is identical with the calling junction 25 shown in Figs. 6 and 7 the terminals ROX of the several registers replacing the terminals RO in Fig. 6 and the output terminals RT being replaced by output terminals RTX of which one is shown in Fig. 2.

Referring to Figure 8 this is a theoretical circuit diagram of a suitable called unit (16, Figure 1). In Figure 8 a control terminal $PI_2$ is connected through relay contacts $RB_3$, a relay winding RQ and a battery $BAT_{28}$ to earth. The terminal $PI_2$ is connected to one of the PI terminals of the bank S3 of the uniselector in one of the sub's line circuits (Figure 2). Two terminals $+I_2$ and $-I_2$ are connected through relay contacts F2 and F3 respectively, and capacitors $C_{22}$ and $C_{23}$ to a winding $MW_2$ of a hybrid transformer $HY_2$. An output winding $OW_2$ of the transformer $HY_2$ has one terminal earthed and the other terminal thereof is connected through a capacitor $C_{24}$ to the control grid of a pentode valve $V_{24}$ whose cathode is earthed. The anode of the valve $V_{24}$ is connected through a load resistor $R_{32}$ to the positive terminal of a source HT+11 of D. C. whose negative terminal is earthed. The anode is also connected through a capacitor $C_{25}$ to an output terminal $RSP_2$, and the screen grid is connected directly to the positive terminal of the source HT+11. Negative bias is applied to the control grid of the valve $V_{24}$ from a bias source $-GB_{21}$. The suppressor grid is connected through a capacitor $C_{26}$ to relay contacts CD1, and through a resistor $R_{33}$ to the negative terminal of a bias source $-GB_8$ whose positive terminal is earthed.

An input terminal $GSPO_1$ is connected through a capacitor $C_{27}$ to the control grid of a pentode valve $V_{25}$ whose cathode is earthed. The control grid of the pentode $V_{25}$ is also connected through a resistor $R_{34}$ to the negative terminal of a bias source $-GB_9$ whose positive terminal is earthed. The anode of the pentode $V_{25}$ is connected through the primary winding of a transformer $XF_2$ to the positive terminal of a source HT+12 of D. C. whose negative terminal is earthed. The anode is also connected through a capacitor $C_{28}$ to the control grid of a triode valve $V_{26}$ whose cathode is earthed. The anode of the triode $V_{26}$ is connected through a relay winding RB to the positive terminal of a source HT+13 of D. C negative terminal is earthed. The control grid of the triode $V_{26}$ is connected through a rectifier $W_{15}$ to the negative terminal of a bias source $-GB_{11}$ whose positive terminal is earthed. The screen grid of the pentode $V_{25}$ is connected through a resistor $R_{35}$ to the positive terminal of the source HT+12. The suppressor grid is connected through a resistor $R_{36}$ to the negative terminal of a bias source $-GB_{10}$ whose positive terminal is earthed, and through a capacitor $C_{29}$ to the relay contacts CD1.

The transformer $XF_2$ has two secondary windings $S_1XF_2$ and $S_2XF_2$. One terminal of the winding $S_1XF_2$ is connected to the negative terminal of a bias source $-GB_{12}$ whose positive terminal is earthed, and the other terminal thereof is connected through a rectifier $W_{16}$ to the control grid of a pentode valve $V_{27}$ whose cathode is earthed. One terminal of the winding $S_2XF_2$ is connected to the negative terminal of a bias source $-GB_{13}$ whose positive terminal is earthed, and the other terminal of the winding $S_2XF_2$ is connected through a rectifier $W_{17}$, and a resistor $R_{37}$ to the control grid of the pentode $V_{27}$.

A rectifier $W_{18}$ is connected between the negative terminal of the source $-GB_{12}$ and the left-hand terminal of the winding $S_2XF_2$ in the drawing.

The primary winding of the transformer $XF_2$ is tuned by a capacitor $C_{30}$ which is shunted by a resistor R194.

The anode of the pentode $V_{27}$ is connected through the input circuit of a low-pass filter $FIL_2$ to the positive terminal of a source HT+14 of D. C. whose negative terminal is earthed. The screen grid of the pentode $V_{27}$ is connected through a resistor $R_{38}$ to the positive terminal of the source HT+14 and is decoupled by a capacitor $C_{32}$. One output terminal of the low-pass filter $FIL_2$ is connected to earth and the other output terminal is connected through the winding $IW_2$ of the hybrid transformer $HY_2$ to earth.

The terminal $-I_2$ is normally connected to earth through the relay contacts F3 and a battery $BAT_{33}$, and the terminal $+I_2$ is normally connected through the relay contacts F2 and through one winding of a relay F to the moving contact of relay contacts RB4. These contacts are normally open and the fixed contact thereof is connected through the secondary winding of a transformer $XF_3$ to earth. The primary winding of the transformer $XF_3$ is connected to terminals TR to which ringing current is applied from a suitable source (not shown). The contacts F2 are bridged by a capacitor $C_{64}$. One terminal of the other winding of relay F is connected through a battery $BAT_{29}$ to earth and the other terminal thereof is connected through relay contacts F1 and RB1 to earth. One winding of a relay RD is connected between the right-hand plate (in the drawing) of the capacitor $C_{22}$ and earth. The other winding of the relay RD has one terminal connected to the right-hand plate of the capacitor $C_{23}$ and has the other terminal connected through a battery $BAT_{30}$ to earth.

A uniselector ZRU has three banks ZRU1, ZRU2 and ZRU3, each of which has a home contact and bank contacts. The bank ZRU1 has ten bank contacts which are connected to the translator 25 to be described later. The wiper of the bank ZRU1 is connected through a resistor $R_{39}$ to the control grid of a gas-filled triode valve $V_{28}$. The cathode of the valve $V_{23}$ is connected to the negative terminal of a bias source $GB_{14}$ whose positive terminal is earthed. The anode of the valve $V_{28}$ is connected through relay contacts DA1 to one terminal of a relay winding DA. The other terminal of the winding DA is connected through relay contacts RQ1 and RB2 in parallel to the positive terminal of a source HT+15 of D. C. whose negative terminal is earthed.

The bank ZRU2 is a homing bank and has its homing arc $BC_6$ connected to earth through relay contacts DA2. The wiper of the bank ZRU2 is connected through contacts ZRU*dm*, operating winding ZRU, a relay winding CD and a battery $BAT_{31}$ in series to earth. The home contact of the bank ZRU2 is connected through relay contacts RQ2 to earth.

The bank ZRU3 has ten bank contacts which are connected to ten terminals $Tu_0$ to $Tu_9$ respectively. The wiper of the bank ZRU3 is connected through a resistor $R_{40}$ to the fixed contact of contacts CD1.

A uniselector ZRD has three banks ZRD1, ZRD2 and ZRD3, each of which has a home contact and bank contacts. The bank ZRD1 has ten bank contacts which are connected to the translator 25. The wiper of ZRD1 is connected through a resistor $R_{41}$ to the control grid of a gas-filled triode $V_{29}$ whose cathode is connected to earth through a bias source $GB_{15}$. The anode of the valve $V_{29}$ is connected through relay contacts UA1 to one terminal of a relay winding UA and the other terminal of the winding UA is connected through the relay contacts RQ1 and RB2 to the positive terminal of the source HT+15.

The bank ZRD2 is a homing bank and the homing arc $BC_7$ is connected through relay contacts UA2 to earth, and the home contact through RQ2 to earth. The wiper of the bank ZRD2 is connected through the mechanically operated contact ZRD*dm*, the operating winding ZRD, the relay winding CD and the battery $BAT_{31}$ in series to earth.

The bank ZRD3 has ten bank contacts which are connected to ten terminals $Td_0$ to $Td_9$ respectively. The wiper of the bank ZRD3 is connected through a rectifier $W_{20}$ to the fixed contact of contacts CD1.

The moving contact of the contact CD1 in addition to being connected through the capacitors $C_{26}$ and $C_{29}$ to the suppressor grids of the pentodes $V_{24}$ and $V_{25}$ respectively is connected through a resistor $R_{42}$ to earth and directly to the moving contact of contacts RD1. The fixed contact of contacts RD1 is connected through a resistor $R_{43}$ to earth and through a capacitor $C_{33}$ to the control grid of a triode valve $V_{31}$ whose cathode is earthed. Negative bias is applied through a resistor $R_{44}$ to the control grid of the triode $V_{31}$ from the negative terminal of a bias source $-GB_{16}$ whose positive terminal is earthed. The anode of the valve $V_{31}$ is connected through a capacitor $O_{34}$ to an output terminal $ASP_1$, and through a resistor $R_{45}$ to the positive terminal of a source HT+16 of D. C. whose negative terminal is earthed.

The translator 25 is connected through relay contacts RQ3 to the positive terminal of a source HT+17 of D. C. whose negative terminal is earthed. Ten terminals $Tu'_0$ to $Tu'_9$ and ten terminals $Td'_0$ to $Td'_9$ are connected to the translator, and a further terminal $CS_2$ which is connected to the CS terminals in the sub's line circuits (see Figure 2).

Referring now to Figure 9 this is a theoretical circuit diagram of the translator 25. The translator comprises two groups of gas-filled triode valves each group containing ten valves. A first of the groups contains ten triodes $V_{32}$ to $V_{41}$ whose cathodes are connected to earth through resistors $R_{46}$ to $R_{55}$ respectively, and directly to the ten bank contacts respectively of the uniselector bank $ZRU_1$. The anodes of the triodes $V_{32}$ to $V_{41}$ are connected together and through the relay contacts RQ3 to the terminal HT+17. The terminals $Tu'_0$ to $Tu'_9$ are connected through ten rectifiers $W_{21}$ to $W_{30}$ ten resistors $R_{66}$ to $R_{75}$ and ten rectifiers $W_{100}$ to $W_{109}$ respectively in series to the control grids of the triodes $V_{32}$ to $V_{41}$. The cathode of $V_{101}$ is connected through ten resistors $R_{86}$ to $R_{95}$ to the junctions of the rectifiers and resistors connecting the terminals $Tu'_0$ to $Tu'_9$ respectively to the control grids of the triodes $V_{32}$ to $V_{41}$. The control grids of the triodes $V_{32}$ to $V_{41}$ are connected through capacitors $C_{103}$ to $C_{112}$ and resistors $R_{207}$ to $R_{216}$ respectively to earth.

The second group contains ten triodes $V_{42}$ to $V_{51}$ whose cathodes are earthed through resistors $R_{56}$ to $R_{65}$ respectively. The cathodes of these valves are also connected directly to the ten bank contacts respectively of the uniselector bank ZRD1. The anodes of the valves $V_{42}$ to $V_{51}$ are connected together and through the relay contacts RQ3 to the positive terminal of the source HT+17. The terminals $Td'_0$ to $Td'_9$ are connected through ten rectifiers $W_{31}$ to $W_{40}$, ten resistors R76 to R85 and ten rectifiers $W_{110}$ to $W_{119}$ respectively in series to the control grids of the valves $V_{42}$ to $V_{51}$. The terminal $CS_2$ is connected through a capacitor $C_{101}$ to the control grid of a valve $V_{101}$ which has a cathode load resistor $R_{203}$. The cathode of V101 is connected through ten resistors $R_{96}$ to $R_{105}$ to the junctions of the rectifiers $W_{31}$ to $W_{40}$ and resistors $R_{76}$ to $R_{85}$ respectively.

Referring now to Figure 10 this is a circuit diagram of an arrangement suitable for use as the GO speech junctions 17 of Figure 1. The output terminals $GSP_1$ to $GSP_{100}$ of the 100 calling units respectively (see $GSP_1$ of Figure 3) are connected to input terminals $GSP_1$ to $GSP_{100}$ of the arrangement of Figure 10. In Figure 10 only 10 of the terminals $GSP_1$ to $GSP_{100}$ are shown. The input terminals $GSP_1$ to $GSP_{100}$ are grouped into ten groups of ten terminals each and the ten groups are connected to the control grids of ten pentodes of which five are shown at $V_{52}$ to $V_{56}$. The terminals $GSP_1$ to $GSP_{10}$ are connected through rectifiers $W_{41}$ to $W_{50}$ respectively to the control grid of the pentode $V_{52}$. The other nine groups of input terminals are connected in a like manner to the control grids of the other nine input pentodes respectively. The five pentodes $V_{52}$ to $V_{56}$ have a common cathode resistor $R_{106}$, and the cathodes of the other five input pentodes (not shown) are likewise provided with a common cathode resister. The anodes of the five input pentodes $V_{52}$ to $V_{56}$ are connected together as shown and have a common wide band anode load comprising a resistor $R_{107}$, an inductor $L_1$ and a capacitor $C_{35}$. A resistor $R'_{107}$ and a capacitor $C_{36}$ are for decoupling purposes. The anode connections of the other five input pentodes are the same as those shown for the pentodes $V_{52}$ to $V_{56}$.

The common anode connection of the five pentodes $V_{52}$ to $V_{56}$ is connected through a capacitor $C_{39}$ to the control grid of a pentode valve $V_{57}$. The common anode connection of the other five input pentodes (not shown) is connected through a capacitor $C_{47}$ to the control grid of a pentode valve $V_{58}$. The control grid of the pentode $V_{57}$ is connected to earth through a rectifier $W_{51}$ and a resistor $R_{108}$ in parallel, and the control grid of the pentode $V_{58}$ is connected to earth through a rectifier $W_{52}$ and a resistor $R_{111}$ in parallel. The screen grids of the two pentodes $V_{57}$ and $V_{58}$ are connected together and through a resistor $R_{110}$ to the common cathode connection of the two pentodes $V_{57}$ and $V_{58}$. The suppressor grids of these two pentodes are earthed.

The anodes of the two pentodes $V_{57}$ and $V_{58}$ are connected together and have a common wide band load comprising a resistor $R_{112}$, an inductor $L_2$ and a capacitor $C_{37}$. A resistor $R_{113}$ and a capacitor $C_{38}$ are for decoupling purposes, and the junction of $R_{113}$ and $C_{38}$ is connected to the screen grids of the two pentodes $V_{57}$ and $V_{58}$.

The anodes of the two pentodes $V_{57}$ and $V_{58}$ are connected through a capacitor $C_{40}$ to the control grid of a pentode valve $V_{59}$. The control grid of this valve is also connected to earth through a rectifier $W_{53}$ and a resistor $R_{114}$ in parallel. The cathode of the pentode valve $V_{59}$ is connected to earth through a resistor $R_{115}$ and the anode has a wide band load comprising a resistor $R_{116}$, an inductor $L_3$ and a capacitor $C_{41}$. A resistor $R_{117}$ and a capacitor $C_{42}$ are for decoupling purposes. The junction of $R_{117}$ and $C_{42}$ is connected to the screen grid of the valve $V_{59}$ and the suppressor grid of the valve $V_{59}$ is earthed.

The anode of the valve $V_{59}$ is connected through a capacitor $C_{43}$ to the control grid of a triode valve $V_{60}$, the control grid also being connected to earth through a resistor $R_{118}$ and in parallel therewith a rectifier $W_{54}$ and bias source $GB_{17}$ connected in series. The valve $V_{60}$ has a cathode load resistor $R_{119}$ and the anode thereof is decoupled by means of a resistor $R_{120}$ and a capacitor $C_{44}$. The load resistor $R_{119}$ is coupled by means of a wide band coupling comprising two capacitors $C_{45}$ and $C_{46}$ and an inductor $L_4$ to the control grids of three cathode follower valves $V_{61}$ to $V_{63}$. The control grids of these valves are also connected to earth through a rectifier $W_{55}$ and bias source $GB_{18}$. The valves $V_{61}$ to $V_{63}$ have cathode load resistors $R_{121}$ to $R_{123}$ respectively and the cathodes are connected to output terminals $GSPO_1$ to $GSPO_3$ respectively.

Although three cathode followers $V_{61}$ to $V_{63}$ have been shown more may be used if desired.

An arrangement as shown in Fig. 10 may also be used as the Return speech junction 18 and as the metering and release junction 19 of Fig. 1. When used as the Return speech junction the terminals $GSP_1$ to $GSP_{100}$ are replaced by the terminals $RSP_1$ to $RSP_{100}$ (see $RSP_2$, Fig. 8), and the terminals $GSPO_1$ to $GSPO_3$ are replaced by the terminals $RSPO_1$ to $RSPO_3$ (see $RSPO_1$, Fig. 3). When the arrangement of Fig. 10 is used as the metering and release junction the terminals $GSP_1$ to $GSP_{100}$ are replaced by the terminals $ASP_1$ to $ASP_{100}$ (see $ASP_1$, Fig. 8) and the terminals $GSPO_1$ to $GSPO_3$ are replaced by terminals $ASPO_1$ to $ASPO_3$ (see $ASPO_1$, Fig. 3).

Referring now to Fig. 11 this is a circuit diagram of part of the busy junction 20 of Fig. 1. The 2,000 input terminals to the busy junction are grouped in groups of ten and of the 200 groups one is shown at $BJ_1$ to $BJ_{10}$ in the figure. These 2,000 terminals are connected to the terminals BJ in the 2,000 sub's line circuits respectively (see $BJ_1$ in Fig. 2).

Pulses appearing at the terminals $BJ_1$ to $BJ_{10}$ are combined through resistors $R_{124}$ to $R_{143}$. The combined outputs of the 200 groups are combined in further groups of ten by means of rectifiers the rectifiers of one group being shown at $W_{56}$ to $W_{65}$. The outputs of these 20 groups are combined in two further groups of ten each by means of resistors and a see-saw circuit. One of these groups of resistors is shown at $R_{145}$ to $R_{154}$ which are connected to the control grid of a pentode valve $V_{52}$ connected in a see-saw circuit comprising resistors $R_{155}$, $R_{156}$ and $R_{157}$. The see-saw circuit functions as described in the M. I. T. Radiation Laboratory Series, vol. 19, chapter 2, section 5, 27 et seq., Fig. 2.12 (a) published by the McGraw-Hill Book Company Inc. A resistor $R_{179}$ and a capacitor $C_{48}$ are for decoupling the anode circuit of the valve $V_{52}$. The cathode and suppressor grid of this valve are connected to earth, the screen grid to the junction of $R_{179}$ and $C_{48}$, and negative bias for the control grid is supplied from a bias battery through resistors $R_{177}$ and $R_{158}$. The gain of the see-saw circuit is made substantially unity by appropriate selection of the valves of the resistors in the circuit.

The second see-saw circuit comprises a pentode valve $V_{53}$ connected in a circuit identical with that associated with the valve $V_{52}$, and comprising resistors $R_{160}$ to $R_{164}$ and a capacitor $C_{49}$.

The outputs of the two valves $V_{52}$ and $V_{53}$ are combined through two resistors $R_{159}$ and $R_{165}$ and applied to the control grid of a pentode valve $V_{54}$ connected in a further see-saw circuit. The cathode of the pentode is earthed and the anode is coupled to the control grid by means of resistors $R_{166}$, $R_{168}$, $R_{169}$ and $R_{170}$. A resistor $R_{167}$ and a capacitor $C_{50}$ serve to decouple the anode circuit of the valve $V_{54}$.

The junction of the resistors $R_{168}$ to $R_{170}$ is connected to the control grid of a pentode valve $V_{55}$ which is coupled to a further pentode valve $V_{56}$ by means of a resistor $R_{171}$ which is common to the cathodes of both valves $V_{55}$ and $V_{56}$.

The anode circuit of the valve $V_{56}$ contains an anode load resistor $R_{172}$ and is decoupled by means of a resistor $R_{173}$ and capacitor $C_{54}$. The suppressor grids of the valves $V_{55}$ and $V_{56}$ are earthed and their screen grids are connected to the junction of $R_{173}$ with $C_{54}$.

A capacitor $C_{51}$ serves to connect the anode of the valve $V_{56}$ to the control grid of a triode $V_{58}$. D. C. restoration of the voltages applied to the control grid of the valve $V_{58}$ is effected by a diode valve $V_{57}$ and a resistor $R_{174}$. The triode $V_{58}$ has a cathode load $R_{175}$ and acts as a cathode follower the cathode being connected to an output terminal BJO. This terminal is connected to the terminal of like reference in each register (see Fig. 5).

A suitable high frequency pulse generator (14 of Fig. 1) will now be described with reference to Fig. 12 (*a*) to (*e*). In Fig. 12 (*a*) the output of an oscillator $OS_1$ is applied to a ringing circuit comprising a pentode valve $V_{59}$ whose anode circuit includes the primary winding of a transformer $XF_4$. The secondary winding of the transformer $XF_4$ has a centre tap connected to earth through a resistor $R_{181}$ which is decoupled by a capacitor $C_{54}$. The lower end of the secondary winding is connected to the cathode of a diode valve $V_{60}$ whose anode is connected through a resistor $R_{182}$ to the positive terminal of a source HT+18 of D. C. whose negative terminal is earthed. The anode of the diode $V_{60}$ is also connected directly to the control grid of a pentode valve $V_{61}$ whose cathode is connected to earth through a bias resistor $R_{183}$ which is decoupled by a capacitor $C_{55}$.

During the positive half cycles of the voltage at the cathode of the diode $V_{60}$ this diode is non-conducting. Thus the control grid of the valve $V_{61}$ becomes highly positive and anode current of high value flows in the anode circuit of the valve $V_{61}$.

During negative half-cycles of the voltage at the cathode of the diode $V_{60}$ this diode conducts and it is arranged that the voltage at the control grid of the valve $V_{61}$ falls below the value for anode current cut-off in the valve $V_{61}$. Thus the wave form of the voltage at the anode of the valve $V_{61}$ is substantially rectangular. The "mark-to-space ratio" of this wave form can be varied by changing the values of $R_{181}$ and $R_{183}$. A value of 4:1 is used.

The potential variations at the anode of the valve $V_{61}$ are applied through a cathode follower valve $V_{62}$ to a terminal TA.

A diode valve $V_{63}$ and two pentode valves $V_{64}$ and $V_{65}$ function in like manner to provide rectangular pulses of the same frequency but in anti-phase at a terminal TB.

The output of the valve $V_{65}$ is differentiated by a capacitor $C_{57}$ and resistor $R_{187}$ then applied through an inverter comprising a valve $V_{66}$ to a terminal TC.

In Fig. 12(*b*) the input terminal TC which corresponds to the terminal TC in Fig. 12(*a*) is coupled through two diode valves $V_{67}$ and $V_{68}$ to a multivibrator comprising two valves $V_{69}$ and $V_{70}$. The multivibrator functions in known manner as a frequency divider and provides a division ratio of 5:1. The output voltage of this multivibrator is fed through a cathode follower valve $V_{71}$ to an output terminal TD. The output applied to TD is also differentiated by a capacitor $C_{58}$ and resistor $R_{188}$ and applied to a phase inverter comprising a pentode valve $V_{72}$.

The output of this phase inverter is fed through two diodes $V_{73}$ and $V_{74}$ to a multivibrator comprising two pentodes $V_{75}$ and $V_{76}$. This multi-vibrator functions as a frequency divider and provides a division ratio of 2:1, and its output is applied through a phase splitter comprising a valve $V'_{73}$ to two terminals TE and TF. The voltage applied to the terminal TF is also differentiated by a capacitor $C_{59}$ and resistor $R_{189}$ and applied through a phase inverter comprising a valve $V'_{74}$, to a terminal TG.

In Fig. 12(*c*) the terminal TG, which corresponds to the terminal TG of Fig. 12(*b*) is connected to a further multivibrator $MV_1$ which functions as a frequency divider and provides a division ratio of 5:1. The output of $MV_1$ is applied through a cathode follower $CF_1$ to a terminal TH.

In Fig. 12(*d*) the terminal TD corresponds to the terminal TD of Fig. 12(*b*) and is connected to the input of a delay network $DL_1$ of known kind which has ten equally spaced taps $T_1$ to $T_{10}$ respectively and is terminated by a matched termination $R_{184}$. The delay of the network $DL_1$ is made equal to the recurrence period of the pulses applied at the terminal TD from the valve $V_{71}$ of Fig. 12(*b*), and the delay from the input to the first tap $T_1$ is made equal to the delay between adjacent taps.

The terminal TH in Fig. 12(*d*) corresponds to the terminal TH of Fig. 12(*c*) and is connected to the input end of a delay network $DL_2$ which has ten equally spaced taps $T_{11}$ to $T_{20}$. The delay of the network is made equal to the recurrence period of the pulses applied at TH and the delay from the input to the tap $T_{11}$ is made equal to the delay between adjacent taps. The network $DL_2$ is terminated by a matched termination $R_{185}$.

The pulse generator is provided with twenty output circuits of which one is shown in Fig. 12(*e*). In Fig. 12(*e*) an input terminal $T_1$ which corresponds to $T_1$ in Fig. 12(*d*) is connected to the control grid of a pentode $V'_{74}$. An input terminal TA which corresponds to TA in Fig. 12(*a*) is connected to the suppressor grid of the pentode $V''_{74}$. A cathode bias resistor $R_{186}$ decoupled by a capacitor $C_{56}$ provides bias for the pentode and by means of a diode $V''_{75}$ the suppressor grid is kept normally at negative potential as a result of the D. C. restoration action of the diode in response to the positive-going pulses applied at the terminal TA. This negative potential on the suppressor grid is arranged to be sufficient to render the pentode $V''_{74}$ normally non-conducting.

Thus the pentode $V''_{74}$ acts as a gate and a pulse applied to the terminal $T_1$ passes through the gate only if a pulse is simultaneously applied to the terminal TA.

The output of the valve $V''_{74}$ is applied through a phase inverter $V''_{76}$ and a cathode follower $V_{77}$ to an output terminal $Tu_0$.

The other 19 output circuits are identical with that shown in Fig. 12(*e*) and their outputs appear at terminals $Tu_1$ to $Td_9$ respectively.

The terminal TA is also connected to the suppressor grids of the gates in the four output circuits connected to the terminals $Tu_2$, $Tu_4$, $Tu_6$ and $Tu_8$ and the terminals $T_3$, $T_5$, $T_7$ and $T_9$ are connected to the control grids of those four gates.

The terminal TB of Fig. 12(*a*) is connected to the suppressor grids of the gates in the five output circuits connected to the terminals $Tu_1$, $Tu_3$, $Tu_5$, $Tu_7$ and $Tu_9$ and the terminals $T_2$, $T_4$, $T_6$, $T_8$ and $T_{10}$ are connected to their control grids.

The terminal TE is connected to the suppressor grids of the gates of the five output circuits connected to the terminals $Td_0$, $Td_2$, $Td_4$, $Td_6$ and $Td_8$ and the terminals $T_{11}$, $T_{13}$, $T_{15}$, $T_{17}$ and $T_{19}$ are connected to the control grids thereof respectively.

The terminal TF of Fig. 12(*b*) is connected to the suppressor grids of the gates in the remaining five output circuits and the terminals $T_{12}$, $T_{14}$, $T_{16}$, $T_{18}$, and $T_{20}$ of Figure 12(*d*) are connected to the control grids thereof respectively.

Thus the pulses appearing at the terminals $Td_0$ to $Td_9$ are as shown at $d_0$ to $d_9$ in Figure 13, and the pulses appearing at the terminals $Tu_0$ to $Tu_9$ are as shown at $u_0$ to $u_9$ in Figure 13.

The pulses $d_0$ to $d_9$ and $u_0$ to $u_9$ are combined in gates (of which two will be described later) to provide the 100 communication channels. For example the pulses $d_3$ are applied to open and close a gate to which the pulses $u_4$ are applied to provide channel No. 34. Only one of the $u_4$ pulses passes through this gate during each $d_3$ pulse as will be seen from an examination of Figure 13. 100 *u* pulses occur during each cycle of a *d* pulse and the 100 *u* pulses are gated by the *d* pulses to provide the 100 channels.

The pulse width of the *u* pulses, and hence the channel pulses, is arranged to be about 0.5 *u*.sec. and the recurrence frequency of the pulses in each channel is arranged to be about 8,000 per second.

Referring to Figure 14 this is a diagram of a suitable pulse generator for use at 21 in Figure 1. The generator shown comprises an oscillator $OSC_2$ which generates sine waves at a frequency of 200 kc./s. The output of the oscillator $OSC_2$ is converted into an oscillation of square wave form by a known circuit including a valve $V_{123}$ and the oscillations of square wave form are differentiated by a circuit comprising a capacitor $C_{110}$ and a resistor $R_{267}$. The narrow pulses resulting from the differentiation are applied to the control grid of a valve $V_{124}$ connected as a cathode follower and the positive-going pulses appearing at the cathode of the valve $V_{124}$ at a frequency of 200,000 P. P. S. are passed to a terminal $DT_1$.

A first connection is made from the terminal $DT_1$ to a monostable multi-vibrator $MV_{100}$ which is arranged in known manner to function as a frequency divider providing a division ratio of 4:1. The output of the multi-vibrator $MV_{100}$ is passed to a second mono-stable multi-vibrator $MV_{101}$ which also acts as a frequency divider and provides a division ratio of 5:1. The output pulses from the multi-vibrator $MV_{101}$ which are of a frequency of 10,000 P. P. S. are passed to a terminal $DT_2$.

A second connection is made from the terminal $DT_1$ to a system of twenty bistable multi-vibrators of which four are shown at $MV_{102}$, $MV_{103}$, $MV_{104}$, and $MV_{105}$ respectively. The terminal $DT_2$ is also connected to the system of multi-vibrators $MV_{102}$ to $MV_{105}$.

The pulses appearing at the terminal $DT_2$ are arranged to "switch on" the first multi-vibrator $MV_{102}$ in the system of twenty. After 5 micro-seconds however a pulse is applied from the terminal $DT_1$, which switches off the multi-vibrator $MV_{102}$. The coupling between the multi-vibrators $MV_{102}$ and $MV_{103}$ is made in accordance with known technique such that when the multi-vibrator $MV_{102}$ is switched off the multi-vibrator $MV_{103}$ is switched on. This process continues until all twenty of the multi-vibrators have been switched on and off in turn each one remaining switched on for a period of 5 micro-seconds.

Just as the last multi-vibrator is switched off the next pulse appears at the terminal $DT_2$ and the whole process is repeated. The twenty output terminals $Td'_0$ to $Tu'_9$ are connected to the twenty bistable multi-vibrators respectively.

Referring to Figure 15, this is a block schematic diagram of a suitable pulse generator for use at 26 in Figure 1. The terminal $DT_2$ is the terminal $DT_2$ in Figure 14 at which pulses having a recurrence frequency of 10,000 P. P. S. appear, and is connected through two cascaded multi-vibrators $MV_{106}$ and $MV_{107}$ to a terminal $DT_3$. The multi-vibrators $MV_{106}$ and $MV_{107}$ are arranged to function as frequency dividers providing division ratios of 2:1 and 5:1 respectively whereby an overall division ratio of 10:1 is obtained. Thus the pulses appearing at the terminal $DT_3$ occur at 1,000 P. P. S. These pulses are fed into a system of ten bi-stable multi-vibrators of which four are shown at $MV_{108}$ to $MV_{111}$. The pulses appearing at the terminal $DT_2$ are also applied direct to the multi-vibrators $MV_{108}$ to $MV_{111}$. It is arranged, as in Figure 14, that a pulse applied to the multi-vibrator $MV_{108}$ switches it on and the next succeeding pulse from the terminal $DT_2$ direct switches off the multi-vibrator $MV_{108}$. The multi-vibrator $MV_{108}$ on being switched off switches on the multi-vibrator $MV_{109}$ which is switched off by the next succeeding pulse applied direct from the terminal $DT_2$. This process is repeated until all ten multi-vibrators in the row have been switched on and off in turn. Thus each of the multi-vibrators is switched on for 100 micro-seconds at a recurrence frequency of 1,000 per second. The output pulses from the ten multi-vibrators are applied to ten output terminals $UP_1$ to $UP_9$ and $UP_0$ respectively which correspond to the terminals of like reference in Figure 5.

The pulses appearing at the terminal $DT_3$ at the frequency of 1,000 P. P. S. are passed through two further cascaded multi-vibrators $MV_{112}$ and $MV_{113}$ to a terminal $DT_4$. The multi-vibrators $MV_{112}$ and $MV_{113}$ provide division ratios of 2:1 and 5:1 respectively and hence an overall division ratio of 10:1. Thus the pulses appearing at the terminal $DT_4$ have a recurrence frequency of 100 P. P. S.

These pulses are applied to a further system of ten multi-vibrators of which four are shown at $MV_{114}$ to $MV_{117}$. These function in the same manner as the multi-vibrators $MV_{108}$ to $MV_{111}$ and provide ten trains of output pulses at the terminals $DP_1$ to $DP_9$ and $DP_0$ respectively which correspond to the terminals of like reference in Figure 5. The duration of each of these pulses is one millisecond and the pulses in each train occur at a recurrence frequency of 100 P. P. S.

The pulses appearing at the terminal $DT_4$ are also applied through two cascaded multi-vibrators $MV_{118}$ and $MV_{119}$ to a terminal $DT_5$. The multi-vibrators $MV_{118}$ and $MV_{119}$ provide a collective division ratio of 10:1 and hence the pulses at the terminal $DT_5$ recur at 10 P. P. S. These are applied to another system of ten bi-stable multi-vibrators of which four are shown at $MV_{120}$ to $MV_{123}$. This system functions in the same manner as those already described to provide ten trains of output pulses at the ten output terminals $CP_1$ to $CP_9$ and $CP_0$ respectively. The pulses in each of these trains recur at 10 P. P. S. and have a duration of ten milliseconds each.

The pulses appearing at the terminal $DT_5$ are applied through two cascaded multi-vibrators $MV_{124}$ and $MV_{125}$ to a final system of ten bi-stable multi-vibrators of which four are shown at $MV_{126}$ to $MV_{129}$. The multi-vibrators $MV_{124}$ and $MV_{125}$ provide a collective division ratio of 10:1 and the final system of multi-vibrators functions in a like manner to those already described to provide ten trains of output pulses at the terminals $MP_1$ to $MP_9$ and $MP_0$ respectively. The pulses in these ten trains recur at one P. P. S. and each pulse has a duration of 100 milliseconds.

Referring to Figure 16 this shows one of the pulses $M_1$ which occurs at the output terminal $MP_1$ of Figure 15. During each $M_1$ pulse ten C pulses ($C_1$ to $C_9$ and $C_0$) occur at the terminals $CP_1$ to $CP_9$ and $CP_0$ (Figure 15) respectively. Two of these C pulses are shown at $C_1$ and $C_2$. During each C pulse ten D pulses ($D_1$ to $D_9$ and $D_0$) occur at the terminals $DP_1$ to $DP_9$ and $DP_0$ respectively (Figure 15). Three trains $D_1$, $D_2$ and $D_3$ of the D pulses are shown. During each D pulse ten U pulses ($U_1$ to $U_9$ and $U_0$) occur at the terminals $UP_1$ to $UP_9$ and $UP_0$ respectively (Figure 15). One train of $U_1$ pulses is shown in Figure 16.

In addition to what is shown in Figure 15 the pulse generator 26 comprises 2,000 gate circuits (one per subscriber) of which one is shown in Figure 17. The function of these circuits is to provide a recurring sequence of 2,000 gating pulses each of 100 micro-seconds duration, the sequence recurring at the rate of once per second, and the several pulses in each sequence being applied to the 2,000 sub's line circuits respectively.

The circuit shown in Figure 17 is for providing the gating pulses for the sub's line circuit number 1464. The terminal $MP_1$ of Figure 15 is connected through a rectifier $W_{122}$ and a resistor R268 to the anode of a rectifier $W_{123}$ whose cathode is connected to the terminal $CP_4$ of Figure 15. The anode of the rectifier $W_{123}$ is connected through a resistor R269 to the anode of a rectifier $W_{124}$ whose cathode is connected to the terminal $DP_6$ of Figure 15. The anode of the rectifier $W_{124}$ is connected through a resistor R270 to the anode of a rectifier $W_{125}$ and to an output terminal SX1464.

In operation the $M_1$ pulses pass through the rectifier $W_{122}$ and resistor R268 to the rectifier $W_{123}$ which is normally conducting and provides a low impedance path whereby the $M_1$ pulses are dropped across the resistor R268. Whenever a $C_4$ pulse occurs at the terminal $CP_4$ however the rectifier $W_{123}$ is rendered insulating and hence that part of each $M_1$ pulse which occurs during a $C_4$ pulse passes through the resistor R269 to the rectifier $W_{124}$. This rectifier is normally conducting and provides a low impedance path except during the occurrence of $D_6$ pulses applied from the terminal $DP_6$. Thus only that part of each $M_1$ pulse which occurs during both a $D_6$ and $C_4$ pulse passes through the resistor R270 to the rectifier $W_{125}$. This is rendered non-conducting only during the $U_4$ pulses applied to the terminal $UP_4$ and hence the only part of each $M_1$ pulse, in this example, to pass to the output terminal SX1464 is the part which occurs during a $U_4$ pulse, a $D_6$ pulse and a $C_4$ pulse.

*Operation*

It will be assumed that the subscriber at the station 10 of Figure 1 is calling the subscriber at the station 11 and that the number of the station 11 is 1464.

When the subscriber at the station 10 lifts his telephone handset from its rest a connection is automatically made from the terminal $LT_1$ of Figure 2 through the subscriber's line and telephone set back to the terminal $LT_2$. Thus a circuit is completed from earth through the battery $BAT_1$ and the relay winding L back to earth. The relay therefore operates and its contacts L1 and L2 close.

These contacts complete the automatic stepping circuit for the uniselector S, this circuit being from earth through the battery $BAT_2$, the winding S, mechanically operated contacts *Sdm*, the relay contacts K4, the relay contacts L2, the wiper and home contact of the bank S3 and the contacts L1 back to earth. The uniselector commences to hunt.

Referring now to Figure 3 (calling unit) it is arranged that when a calling unit is in use the terminal PO thereof ($PO_1$ in Figure 3) is earthed through contacts B1 as will be described later. When, however, the calling unit is free the contacts B1 are open (as will be described later) and the earth is removed from the terminal PO thereof.

Referring again to Figure 2, so long as the wiper of the bank S3 is passing over contacts connected to engaged calling units the automatic stepping circuit of the uniselector remains completed through the earthed terminals PO in those units. When, however, a contact connected to a free calling unit is reached the PO terminal thereof is not earthed and hence the automatic stepping circuit is broken and the motion of the wiper arrested.

The relay K is then energised through a circuit comprising the battery $BAT_2$, the winding S, the contacts *Sdm*, and the relay contacts L1. The resistance of the relay winding K is made sufficiently high to prevent further operation of the stepping circuit as a result of the current flowing in the circuit of the relay winding K.

Relay contacts K1 to K7 close. Contacts K1 and K2 connect the terminals $LT_1$ and $LT_2$ through to the wipers of the uniselector banks S1 and S2. Assuming the wiper of the bank S3 to be arrested on contact $PO_1$, the wipers of S1 and S2 connect the terminals $LT_1$ and $LT_2$ to the terminals $+O_1$ and $-O_1$ respectively.

Whilst this is occurring the circuit in the seized calling unit operates to put an earth on the terminal $PO_1$ as will be described later.

When the relay contacts K1 and K2 close the relay winding L becomes de-energised and the relay contacts L1 and L2 open. The relay K remains operated however because of the earth applied to the terminal $PO_1$ by the seized calling unit.

The operation of the remainder of the circuit of Figure 2 will be described later.

Referring now to Figure 3, assuming this to be the seized calling unit current flows from earth through the left hand winding of the relay windings A, through the relay contact D1, through the calling subscriber's line, back through the relay contacts D2, through the right-hand winding A and through the battery $BAT_3$ to earth. Thus the relay A operates and its contacts A1 and A2 close.

The contacts A2 apply an earth to the cathode of the gas-filled triode $V_2$, and hence prepare this valve for later operation.

The contacts A1 complete the circuit of the relay winding B the circuit being from earth through the battery $BAT_9$ through the winding B and the contacts A1 to earth. The relay contacts B1 to B5 close. The contacts B1 apply an earth to the terminal $PO_1$. The contacts B2 prepare a circuit for transmitting subsequent dialling impulses to the terminal IMP. The contacts B3 connect the terminal $P_1$ to the contacts E3 and thence through the left-hand relay winding E to the negative terminal of the battery $BAT_6$. The contacts B4 put an earth on the busbar $BUS_1$. The contacts B5 connect the terminal GP to the suppressor grids of the two valves $V_4$ and $V_5$.

It is assumed that the seized calling unit terminates channel No. 1. The high-frequency pulses $d_0$ and $u_1$ (Fig. 13) are therefore applied to the calling unit at $Td_0$ and $Tu_1$ from the terminals of like reference in Fig. 12(*c*). The rectifier $W_{66}$ provides a low impedance path for all of each $d_0$ pulse applied to the terminal $Td_0$ except that part thereof which occurs during a $u_1$ pulse.

The $u_1$ pulses render the rectifier non-conducting. Thus during the absence of the $u_1$ pulse the $d_0$ pulse applied to the terminal $Td_0$ is dropped across the resistor $R_{179}$. During each $u_1$ pulse coincident with a $d_0$ pulse however, voltage is passed to the terminal GP.

The voltage pulses appearing at the terminal GP are arranged to be positive-going. The negative bias applied to the suppressor grids of the two pentodes $V_4$ and $V_5$ is arranged to be sufficient to render these two valves normally non-conducting. The amplitude of the voltage pulses applied to the suppressor grids of the two pentodes $V_4$ and $V_5$ from the terminal GP is arranged to be sufficient to overcome the bias and to render these two valves conducting. Thus the valves $V_4$ and $V_5$ are gated in channel No. 1, and unmodulated pulses in channel No. 1 are transmitted from the anode of $V_4$, through the capacitor $C_5$ to the terminal $GSP_1$.

The manner in which a register is allotted to the seized calling unit will now be described. An earth is applied to the terminal AL through the contacts B4, the busbar $BUS_1$, and the contacts E2.

Referring now to the register and calling unit finder circuit of Figure 5, whenever a register is free an earth is put on to the terminal R through the contacts KF6, and a connection is made from earth through the battery $BAT_{17}$ and the contacts $KF_5$ tho the terminal Q.

Referring to the allotter circuit of Figure 4 the earth on the terminal AL from the seized calling unit completes the energising circuit of the relay ST through the battery $BAT_{11}$. Thus contacts ST1, ST2 and ST3 close. The automatic stepping circuit of the uniselector FD is completed from earth through the battery $BAT_{12}$, the winding FD, the mechanically operated contacts FD*dm*, and the contacts ST1, DK1 and ST3 to the earthed terminal R of a free register. Thus the uniselector commences to hunt.

The contacts ST2 connect the relay winding DK between the earthed terminal R and the wiper of the uniselector bank FD1. When the terminal Q of the free register is reached by the wiper of the bank FD1 the energising circuit of the winding DK is completed through the contacts KF5 (Figure 5) and the battery $BAT_{17}$.

The contacts DK1 operate and hence break the automatic stepping circuit of the uniselector FD, and complete the energising circuit of the relay winding DR from the earthed terminal R through the contacts ST3 and DK1, the winding DR and the battery $BAT_{13}$, to earth. Thus the contacts DR1 to DR4 close.

The contacts DR1 complete a circuit from earth, through the contacts DR1, the contacts FK1, the bank FD2, the terminal Y, the mechanically operated contacts CUF*dm* (Figure 5), the operating winding CUF and the battery $BAT_{15}$ to earth. Thus the uniselector CUF of Figure 5 commences to hunt.

When the wiper of the bank CUF5 reaches the terminal $P_1$ connected to the terminal of the same reference in the seized calling unit (Figure 3) a circuit is completed from earth through the battery $BAT_6$ (Figure 3), the left-hand winding of the relay E, the contacts E3 and B3, the terminal $P_1$, the uniselector bank CUF5 (Figure 5) the terminal $P_2$, the uniselector bank FD3 (Figure 4) the contacts DR2 and the left-hand winding of the relay FK. Thus the relay E of Figure 3 and the relay FK of Figure 4 are energised. The contacts FK1 in Figure 4 also completed a circuit from earth through the battery $BAT_{14}$, the right-hand winding of relay FK, the contacts FK1 and DR1 to earth. This circuit holds the relay FK energised until released as will be described later.

In Figure 4 the contacts FK1 and FK2 close. The contacts FK1 complete a circuit from earth through the contacts DR1, FK1 and DR3, the uniselector bank FD4, the terminal X, the relay winding KF (Figure 5) and a battery $BAT_{18}$ to earth. Thus the relay KF of Figure 5 is energized. The opening of the contacts KF2 arrests the motion of the wipers of the uniselector CUF, the earth having already been removed from the terminal Y by the operation of the contacts FK1 of Figure 4. The contacts KF5 (Figure 5) disconnect the battery $BAT_{17}$ from the terminal Q. The contacts $KF_6$ remove the earth from the terminal R and earth the terminals $P_2$ and $P_1$. The contacts $KF_3$ remove the earth from the homing arc of the uniselector bank ZZ2, and the contacts KF4 prepare on earth for the contacts PQ3.

When the earth is removed from the terminal R (Figure 5) and the battery $BAT_{17}$ disconnected from the terminal Q by operation of the relay KF the relay DK of Figure 4 is released. The operation of the contacts DK1 releases the relay DR and the contacts DR1 opening break the energising circuit of the right-hand winding of the relay FK. Referring to Figure 3, when the relay E is energised as previously described the contacts E1 are arranged to close before any other contacts of this relay. A holding circuit is then completed from earth through the contacts B4, the contacts E1, the right-hand winding of the relay E, and the battery $BAT_5$ to earth. Operation of the contacts E3 earths the terminals $P_1$ and hence releases the relay FK of Figure 4. Contacts E2 open and remove the earth from the terminal AL. The allotter is, therefore, released and the wipers thereof home to their home contacts.

Until the allotter is released the contacts FK2 and DR4 (Figure 4) serve to hold the uniselector FD.

Referring to Figure 3 the contacts E4 complete a circuit from earth through the contacts A1, E4 and D5 to the terminal HO. The terminal HO of Figure 5 is connected through the uniselector bank CUF4, through the relay winding H and the battery $BAT_{32}$ to earth. The relay H is therefore operated. The contacts H1 to H8 close and the contacts H2 serve to hold the relay winding KF energised, and hence to hold the register connected to the seized calling unit.

The contacts E5 (Figure 3) connect the charged capacitor $C_{12}$ to the control grid of the valve $V_2$ which, therefore, strikes and energises the relay winding F. The contacts F1 close and hence dialling tone is fed to the calling subscribers line through the windings of the relay A.

The contacts E6 connect the terminals $Td'_0$ and $Tu'_1$ to the terminal $Rd'_u{}'$. The low frequency pulses $d'_0$ and $u'_1$ are applied to the terminals $Td'_0$ and $Tu'_1$ respectively and hence appear at the terminal $Rd'_u{}'$.

When the calling subscriber dials the number he requires (1464 in this example) the dialling impulses operate the relay A and hence the contacts A1.

The relay H of Figure 5 is slow acting and hence is not affected by the rapid operation of the contacts A1 of Figure 3. The contacts H1 connect the terminal IMP through the uniselector bank CUF1, the relay winding AA and the battery $BAT_{16}$ to earth. Thus the operation of the contacts A1 of Figure 3 is followed by the contacts AA1 of Figure 5. The contacts H7 earth the moving contact of the contacts AA1 and hence each time the contacts AA1 are closed by a dialling impulse of the first digit a circuit is made from earth through the contacts H7, AA1 and PQ1, the wiper of the uniselector bank ZZ1, the first bank contact of ZZ1, the operating winding M and the battery $BAT_{20}$ to earth. Thus in the present example where the number of impulses in the first digit is one the wiper on the uniselector bank M1 is set to the first bank contact and hence is connected to the terminal $MP_1$.

The relay BB is slow operating and its contacts BB1 close and open only once for each digit dialled irrespective of the number of impulses in the digit the energising circuit for the winding BB being from earth through the contacts H7 and AA1, the winding BB and the battery $BAT_{25}$ to earth. Thus when the first digit of the wanted number is being dialled the relay contacts BB1 close and remain closed until the dialling impulses for that digit end. The contacts BB1 then open and as a result the wiper of the uniselector bank ZZ1 moves to its second contact.

The dialling impulses of the next digit (4 in this example) are therefore applied to actuate the operating winding of the uniselector C. The wiper of the bank C1 is, therefore, connected through to the terminal $CP_4$. Likewise the dialling impulses of the third and fourth digits dialled (6 and 4 in this example) are applied to actuate the operating windings of the uniselectors D and U respectively and hence the wipers of the banks D1 and U1 are connected through to the terminals $DP_6$ and $UP_4$ respectively.

The pulses $M_1$ to $M_9$ and $M_0$ generated by the low frequency pulse generator 26 of Figure 1 are applied to the terminals $MP_1$ to $MP_9$ and $MP_0$ respectively of Figure 5. Likewise the pulses $C_1$ to $C_9$ and $C_0$ are applied to the terminals $CP_1$ to $CP_9$ and $CP_0$ respectively, the pulses $D_1$ to $D_9$ and $D_0$ are applied to the terminals $DP_1$ to $DP_9$ and $DP_0$ respectively, and the pulses $U_1$ to $U_9$ and $U_0$ are applied to the terminals $UP_1$ to $UP_9$ and $UP_0$ respectively.

Thus the pulses $M_1C_4D_6$ and $U_4$ appear at the wipers of the four uniselector banks $M_1$, $C_1$, $D_1$ and $U_1$ respectively.

The anodes of all the rectifiers $W_{10}$ to $W_{13}$ are connected to the bus-bar $BUS_2$ which is at positive potential, and hence these rectifiers are normally conducting and provide a low impedance path to earth. When an $M_1$ pulse occurs this renders the rectifier $W_{10}$ non-conducting but as the remaining rectifiers $W_{11}$ to $W_{13}$ are still conducting the potential of the bus-bar $BUS_2$ is not altered. Likewise when any C, D or U pulses occur in the absence of other pulses the potential of the bus-bar $BUS_2$ remains unaltered. When U, D, C and M pulses occur simultaneously however the low impedance path between the bus-bar $BUS_2$ and earth is removed and the potential of the bus-bar is increased.

In the present example the pulses appearing at the wipers of the uniselector banks $M_1$, $C_1$, $D_1$, and $U_1$ are the pulses $M_1$, $C_4$, $D_6$, $U_4$. Thus the bus-bar $BUS_2$ becomes positive for the duration of each $U_4$ pulse occurring during $D_6$, $C_4$ and $M_1$ pulses. The bus-bar $BUS_2$ remains positive for the duration of the $U_4$ pulse and this $U_4$ pulse passes through the capacitor $C_{100}$ to the control grid of the valve $V_{100}$ and hence appears at the cathode valve $V_{100}$ and the output terminal RO. The $d'u'$ pulses applied to the resistor $R_{206}$ from the uniselector bank $CUF_2$ are normally dropped across the resistor $R_{206}$ because of the low impedance path provided through the rectifier $WX_{14}$ and the cathode resistor $R_{205}$ of the triode $V_{100}$. Whenever the $U_4$ pulses appears, however, at the terminal RO this pulse renders the rectifier $WX_{14}$ nonconducting whereby the last said low impedance path is broken for the duration of the $U_4$ pulse and the $d'u'$ pulses occurring during that $U_4$ pulse interval pass to the output terminal ROX.

The 100 microsecond recurring $U_4$ pulse appearing at the terminal RO passes through the calling junction 25 of Figure 1 and is applied to the terminal RT in all the subscribers line circuits (Figure 2). Simultaneously with the application of the calling pulse in channel 1464 a gating pulse is applied at the terminal SX1464, in the called subscriber's line circuit and no other, and the calling pulse applied at RT passes through the resistor R1 and the rectifier $WX_1$ and charges the capacitor CX1. The voltage is held in the capacitor $CX_1$ and strikes the tube $V_1$.

The resulting anode current energises the relay Z and contacts Z1 and Z2 close.

The contacts Z1 complete the energising circuit of the relay L and hence the relay contacts L1 and L2 close. The contacts Z2 earth the contact $BC_2$ of the uniselector bank S5.

The contacts L1 complete a circuit from earth through the home contact and wiper of the uniselector control bank S3, through the contacts L2, K4 and S*dm*, the operating winding and the battery $BAT_2$ to earth. The uniselector S commences to hunt. The earth on the contact $BC_2$ of the bank S5 ensures that the uniselector steps over the "out" contacts on the banks S1, S2 and S3 on to the "in" contacts.

Referring to Figure 8 (called unit) when the called unit is free the terminal $PI_2$ is connected through the contacts RB3, the relay winding RQ and the battery $BAT_{28}$ to earth, and hence the terminal $PI_2$ is of negative potential. When, however, the called unit is engaged the contacts $RB_3$ are closed (as will be described later) whereby the terminal $PI_2$ is earthed.

Thus, referring again to Figure 2, the wiper of the bank S3 supplies an earth for the automatic stepping circuit of the uniselector S so long as the wiper is passing over IN contacts connected to engaged called units. When a contact is reached connected to a free called unit, however, the automatic stepping circuit is broken and the motion of the wipers arrested.

The relay K then becomes energized through L1, the earth having been removed from the wiper of S3 and hence from the contacts K4. The contacts K1 and K2 connect the line terminals $LT_1$ and $LT_2$ to the seized called unit.

The contacts K3 close and connect the winding K to the wiper of the bank S3.

The contacts K4 open and hence the moving contact of the contacts K4 is disconnected from the moving contact of the contacts L2 and from the wiper of the bank S5.

The contacts K5 open and extinguish the valve $V_1$ whereby the relay Z becomes de-energized. The contacts Z1 open and de-energise the relay L. The contacts L1 open and remove the direct earth from the relay winding K. The relays Z and L are, however, slow-operating and it is arranged that the earth from the seized called unit is applied to hold the relay K before the contacts L1 open as will be described later. The contacts L2 prepare a homing earth from the bank S4 and the contacts Z2 open and remove the earth from the contact $BC_2$ of the bank S5.

The relay contacts K6 connect the junction of $WX_2$ and R202 to the terminal $BJ_1$ for a purpose to be described later, and the contacts K7 connect the junction of WX2 and R202 through the uniselector bank S6 to the terminal $CS_1$.

As soon as the relay K operates, and whilst the relays Z and L are opening, the relay RQ of the seized called unit Figure 8 becomes energised, the energising circuit being from earth through the winding RQ, the contacts RB3, the uniselector bank S3 of Figure 2, the contacts K3 and L1 to earth. Thus the contacts RQ1, RQ2 and RQ3 of Figure 8 close. The contacts RQ1 apply H. T. to the two valves $V_{28}$ and $V_{29}$. The contacts RQ2 complete the automatic stepping circuits of the uniselectors ZRU and ZRD, and in addition complete the energising circuit of the relay CD. Thus the uniselectors ZRD and ZRU start the hunt, and whilst they are hunting the wipers of the banks ZRD3 and ZRU3 are isolated from the valves $V_{24}$, $V_{25}$ and $V_{31}$ by the opening of the contacts $CD_1$. The relay contacts $RQ_3$ apply HT to the translator 25.

Referring again to Figure 2 the $d'u'$ pulses applied to the terminals RTX are normally dropped across the resistor $R_{202}$, a low impedance path being provided through the rectifier $WX_2$. When, however, the calling pulses appear at the terminal RT they render the rectifier $WX_2$ non-conducting for the duration of each calling pulse. Thus the low impedance path is broken and the $d'u'$ pulses appearing during each calling pulse in the channel 1464 pass through the relay contacts $K_7$ to the wiper of the uniselector bank $S_6$ and pass through the arcuate contact $BC_5$ to the output terminal $CS_1$.

Referring to Figure 9 the $d'$ and $u'$ pulses arriving at the terminal $CS_2$ from the called subscribers line circuit pass to the control grid of the valve $V_{101}$ and hence appear at the cathode of the valve $V_{101}$. From there the pulses are applied to the control grids of the valves $V_{32}$ to $V_{51}$ through the resistors $R_{86}$ to $R_{105}$ and pulse lengthening circuits comprising the rectifiers $W_{100}$ to $W_{119}$ and capacitors $C_{103}$ to $C_{122}$. The rectifiers $W_{21}$ to $W_{40}$ are, however, conducting to these pulses except the rectifiers to which $d'$ and $u'$ pulses are applied from the terminals $Tu'_0$ to $Td'_9$ simultaneously with the $d'$ and $u'$ pulses arriving at the terminal $CS_2$. In this example the pulses $d'_0$ and $u'_1$ appear at the terminal $CS_2$ simultaneously with the pulses $d'_0$ and $u'_1$ applied at the terminals $Td'_0$ and $Tu'_1$. Thus the rectifiers $W_{31}$ and $W_{22}$ are non-conducting in this example and permit the $d'_0$ and $u'_1$ pulses applied to the terminal $CS'_2$ to pass to the control grids of the valves $V_{42}$ and $V_{33}$ respectively. These two valves strike and hence their cathodes become positive.

When the wiper of the bank ZRU1 reaches the bank contact connected to the cathode of the valve $V_{33}$ the positive potential appears at the control grid of the valve $V_{28}$ (Figure 8) and this valve strikes. Similarly the valve $V_{29}$ (Figure 8) strikes when the wiper of the bank ZRD1 reaches the bank contact connected to the cathode of the valve $V_{42}$.

Referring to Figure 8, when the valves $V_{28}$ and $V_{29}$ strike the relays DA and UA become energised by the anode circuits of these two valves. Thus the contacts DA1, DA2, UA1 and UA2 are operated. The contacts DA1 hold the relay DA and extinguish the valve $V_{28}$ and the contacts $DA_2$ break the automatic stepping circuit of the uniselector ZRU. The contacts UA1 hold the relay UA and extinguish the valve $V_{29}$, and the contacts UA2 break the automatic stepping circuit of the uniselector ZRD.

Thus the wipers of the banks ZRD3 and ZRU3 are arrested on the bank contacts connected to the terminals $Td_0$ and $Tu_1$ respectively. The pulses $d_0$ and $u_1$ are applied to these terminals respectively from the high frequency pulse generator. In the absence of a $d_0$ pulse the rectifier $W_{20}$ is conducting and hence the $u_1$ pulses are dropped across the resistor $R_{40}$. The occurrence of a $d_0$ pulse renders the rectifier $W_{20}$ nonconducting and hence the $u_1$ pulse occurring during each $d_0$ pulse passes to the contacts CD1 that is to say pulses in channel No. 1. These contacts close simultaneously with the opening of the automatic stepping circuit of the selectors and the pulses in channel No. 1 pass to the suppressor grids of the valves $V_{24}$ and $V_{25}$.

Thus unmodulated pulses of anode current flow in the valves $V_{24}$ and $V_{25}$ which are arranged to be normally non-conducting by the bias applied thereto from the terminals—$GB_8$ and—$GB_{10}$ respectively. The pulses passed by the valve $V_{25}$ are applied through the capacitor $C_{28}$ to the control grid of the valve $V_{26}$. Thus, pulses of anode current flow in this valve which is arranged to be normally non-conducting by the bias applied thereto from the terminal—$GB_{11}$. Thus the relay RB becomes energised and the contacts RB1 and RB4 thereof are operated.

The contacts RB3 put an earth on the terminal $PI_2$ and hence hold the relay K of Fig. 2 it being arranged that the contacts RB3 close about ½ second before the contacts L1 of Fig. 2 open. The contacts RB2 close and hold the relays DA and UA when the relay RQ becomes de-energised on the operation of the contacts RB3.

The contacts RB4 close and apply ringing voltage from the transformer $XF_3$ to the called subscriber's station. When the called subscriber answers the relay F becomes energised, the energising circuit being from earth through the battery $BAT_{33}$ the contacts F3, the called subscriber's line, the contacts F2, the relay winding F, the contacts RB4 and the secondary winding of the transformer XF3 back to earth. The contacts RB1 and F1 hold the relay F.

The relay RD then becomes energised, the energising circuit being from earth through the battery $BAT_{30}$, one winding of the relay RD, the contacts F3, the called subscriber's line the contacts F2 and the other winding of the relay RD back to earth.

The contacts R*d*1 then apply the pulses in channel No. 1 through the valve $V_{31}$ to the terminal $ASP_1$ and thence through the metering and release junction (19 Fig. 1) to the terminal $ASPO_1$ of Fig. 3 (calling unit). The rectifier $W_7$ is rendered non-conducting thereby and permits the pulses in channel No. 1 from the terminal GP to appear at the control grid of the valve $V_6$. This valve then passes pulses of anode current through the relay winding D which becomes energised.

The contacts D1 and D2 operate and reverse the polarity of the terminals $+O_1$ and $-O_1$. This is for signalling purposes as described on page 278 of Telephony, vol. II by Atkinson. The contacts D4 apply a pulse of current to the terminal $PO_1$ from the battery $BAT_{10}$, the relay contacts J1 being operated after the contacts D4 on de-energisation of the slow operating relay J by the opening of the contacts D3.

The pulse of current applied to the terminal $PO_1$ operates the meter M of Fig. 2 to record the establishment of the call.

The contacts D5 (Fig. 3) open and hence remove the earth from the terminal HO. Thus the relay H of Fig. 5 becomes de-energised. The contacts H2 open and hence the relay KF is de-energised, and thus the register is released and the uniselector CUF homes.

Speech voltages from the calling subscriber's station are transmitted through the transformer $HY_1$ to the control grid of the valve $V_4$ and there amplitude-modulate the pulses in channel No. 1 applied to the terminal $GSP_1$. These amplitude-modulated pulses pass through the GO speech junction to the called units.

Referring to Fig. 8 all pulses from the terminal $GSPO_1$ of the GO speech junction are passed to the control grid of the pentode $V_{25}$ which is gated by channel No. 1 pulses as previously described. Thus only the pulses in channel No. 1 pass to the transformer $XF_2$.

The primary winding is tuned by the capacitor $C_{30}$ to a periodicity of approximately twice the width of the pulses applied thereto from the valve $V_{25}$, and is heavily damped by the resistor $R_{194}$. The winding $S_2XF_2$ has more turns than the winding $S_2XF_1$ and hence provides a greater output voltage than $S_2XF_1$. The negative terminal of the source $-GB_{13}$ is arranged to be about five volts less negative than the negative terminal of the source $-GB_{12}$.

Assuming the charge in the capacitor $C_{31}$ to be such that the potential of the upper plate thereof in the drawing is between that of $-GB_{13}$ and $-GB_{12}$, the rectifiers $W_{16}$ to $W_{19}$ are non-conducting. When a pulse arrives at the the primary winding of the transformer $XF_2$ from the valve $V_{25}$ the leading edge of the pulse shock excites the transformer. The first, and negative, half-cycle of the free oscillation is applied to the anode of $W_{16}$ which, therefore, remains non-conducting, and to the cathode of $W_{17}$ which becomes conducting and hence $C_{31}$ discharges through $R_{37}$ and $W_{17}$ until the potential of its upper plate in the drawing equals the potential of the negative terminal of the source $-GB_{12}$. Any further negative excursion at the cathode of $W_{17}$ is damped by $W_{18}$. Simultaneously $W_{19}$ becomes conducting and as a result the capacitor $C_{31}$ discharges further and its upper plate is left at a potential somewhat below that of the negative terminal of the source $-GB_{12}$.

Just as this negative half-cycle ends, the lagging edge of the pulse arrives and again the transformer $XF_2$ is shock-excited but this time in the opposite sense. The first, and positive, half-cycle of this second free oscillation has no effect on $W_{17}$ and $W_{18}$. The capacitor $C_{31}$ is charged, however, through $W_{16}$ to a value dependent upon the amplitude of the pulse applied to the transformer $XF_2$, and lying between the potentials of the negative terminals of the sources $-GB_{12}$ and $-GB_{13}$.

The damping provided by the resistor $R_{194}$ is arranged to be sufficient to prevent subsequent half-cycles from affecting the charge in the capacitor $C_{31}$.

Thus the capacitor $C_{31}$ presents relatively broad pulses to the valve $V_{27}$ in response to relatively narrow pulses passed by the valve $V_{25}$, the amplitude of the broad pulses being dependent upon the amplitude of the narrow pulses.

The broad amplitude-modulated pulses are demodulated by being passed through the low-pass filter $FIL_2$ and the speech voltages are passed through the transformer $HY_2$, the capacitors $C_{22}$ and $C_{23}$, the contacts F2 and F3, and the called subscriber's line circuit to the called subscriber's line.

Speech voltages from the called subscriber are passed through his line circuit, and the hybrid transformer $HY_2$ to the control grid of the pentode $V_{24}$. Here they serve to amplitude-modulate the pulses (in channel No. 1) applied from the anode of $V_{24}$ to the terminal $RSP_2$. These pulses are applied through the RETURN speech junction to the terminal $RSPO_1$ to Fig. 3 and thence to the control grid of the pentode $V_5$ which is gated by pulses in channel No. 1 applied to the suppressor grid from the terminal GP.

The transformer $XF_1$ in the anode circuit of the valve $V_5$, together with the capacitors $C_7$ and $C_{10}$, the resistors $R_7$ and $R_{195}$, and the rectifiers $W_3$ to $W_6$, function in the same manner as the transformer $XF_2$, capacitors $C_{30}$ and $C_{31}$, resistors $R_{37}$ and $R_{194}$, and rectifiers $W_{16}$ to $W_{19}$ of Fig. 8, to broaden the pulses passed by the valve $V_5$.

The broadened, amplitude-modulated pulses are passed through the valve $V_3$ and are demodulated by a low-pass Filter $FIL_1$. The speech voltages are applied through the transformer $HY_1$ and the calling subscribers line circuit to the calling subscriber's line.

The operation of the arrangement shown when a called subscriber is already engaged will now be described. When the called subscriber is engaged, the relay K in his line circuit (Fig. 2) is already energised and the junction of $WX_2$ and $R_{202}$ is connected through the relay contacts K6 to the terminal $BJ_1$. Thus the *d'* and *u'* pulses arriving at the terminal RTX in the channel intervals of channel No. 1464 in the present example are transmitted to the terminal $BJ_1$ and thence through the Busy junction to the terminal BJO in the register (Fig. 5) allotted to the calling subscriber.

Thus these pulses coincide with the *d'* and *u'* pulses applied from the terminal R*d'u'* to the rectifier $W_{14}$ which is rendered non-conducting thereby. Thus the *d'* and *u'* pulses applied to the terminal BJO pass through the capacitors $C_{13}$ and $C_{14}$ to the control grids of the valves $V_7$ and $V_8$. The *d'* pulse serves to strike the valve $V_7$ whose cathode potential rises. The rise in potential at the cathode of the valve $V_7$ is transmitted to the control grid of the valve $V_8$ but is arranged to be insufficient to strike $V_8$. The *u'* pulse applied to the control grid of $V_8$ is arranged to provide sufficient extra potential to strike $V_8$. The relay BR is, therefore, energised. The contacts $BR_1$ close and hence earth the terminal $BU_1$. Referring to Fig. 3, when the terminal $BU_1$ is earthed the relay G becomes energised. The contacts G1 hold the relay G and the contacts G2 apply the busy tone to the calling subscribers line through the relay windings A and the calling subscriber's line circuit.

When a call is ended and the calling subscriber replaces his handset on its rest, the energising circuit for the relay A (Fig. 3) is broken. The relay contacts A1 return to the position shown thus de-energising the relay B. The contacts B1 remove the earth from the terminal $PO_1$. Thus the relay K (Fig. 2) becomes de-energised, and the uniselector S homes. The calling unit is released and all relays return to their unoperated condition.

Thus the pulses arriving in channel No. 1 in this example at the terminal $GSPO_1$ of Fig. 8 cease and hence the relay RB becomes de-energised. The contacts RB3 open, and the earth is removed from the terminal $PI_2$. Thus the relay K in the called subscriber's line circuit is released and the uniselector in this line circuit homes. The contacts RB1 open and release the relay F (Fig. 8). The contacts RB2 open and release the relays DA and UA. Thus the contacts DA2 and UA2 close and the uniselectors ZRU and ZRD home. The called unit is then ready for use in making another call.

I claim:

1. An automatic telephone exchange comprising a first group of communication channels the number of channels in the group being small relatively to the number of subscribers connected to the exchange, a plurality of channel terminating means connected to terminate one end of the channels respectively, separate line terminating means terminating the subscribers' lines respectively in the exchange, means connecting the line terminating means to said channel terminating means, said line terminating means comprising means responsive to an initial calling signal from a calling subscriber to select a free one of said channel terminating means, a group of registers, allotting means connecting said registers and said channel terminating means to allot a register to a channel terminating means, a second group of communication channels extending from said registers to the said line terminating means respectively, the number of channels in said second group being equal to the number of said line terminating means, said registers comprising means responsive to a further calling signal representative of the number of a called subscriber to transmit in that one of the channels of the second group extending to the line terminating means of the called subscriber a signal to call said called subscriber, a further group of communication channels extending from said registers to said line terminating means respectively, said registers also comprising means responsive to said further calling signals to transmit to the line terminating means of the called subscriber a signal indicating the selected free one of said channel terminating means, further channel terminating means for terminating the other ends of the channels in said first group, and a plurality of control means connected between said line terminating means and said further channel terminating means, said line terminating means comprising selector apparatus responsive to said calling signals to select a free one of said control means and said control means being responsive to said signal indicating said selected free one of the first said channel terminating means to connect one of said further channel terminating means to the same channel as the selected one of the first said channel terminating means and to connect the called line terminating means to the said one of the further channel terminating means.

2. An automatic telephone exchange according to claim 1, wherein the said first group of communication channels is a group of time-sharing pulse communication channels and each channel terminating means comprises a pulse modulator and a pulse demodulator.

3. An automatic telephone exchange according to claim 2, wherein the said second group of channels is a group of time-sharing pulse communication channels, a gate is provided in each of said line terminating means and means are provided for applying gating pulses of different phases to the gates in different ones of said line terminating means.

4. An automatic telephone exchange according to claim 3, wherein said further group of communication channels extending from said registers to said line terminating means respectively is a group of time-sharing pulse communication channels.

References Cited in the file of this patent

UNITED STATES PATENTS

| | | |
|---|---|---|
| 2,324,394 | Holden | July 13, 1943 |
| 2,387,018 | Hartley | Oct. 16, 1945 |
| 2,570,274 | Ransom | Oct. 9, 1951 |
| 2,583,711 | Scowen | Jan. 29, 1952 |
| 2,619,548 | Lesti | Nov. 25, 1952 |
| 2,620,399 | Malthaner | Dec. 2, 1952 |
| 2,638,505 | Van Mierlo | May 12, 1953 |
| 2,649,505 | Ransom | Aug. 18, 1953 |